US011940143B2

(12) United States Patent
Chikaraishi et al.

(10) Patent No.: US 11,940,143 B2
(45) Date of Patent: Mar. 26, 2024

(54) POWER TOOL

(71) Applicant: MAKITA CORPORATION, Anjo (JP)

(72) Inventors: Makoto Chikaraishi, Anjo (JP); Akihiro Hozumi, Anjo (JP); Yutaka Ogiso, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/295,868

(22) Filed: Apr. 5, 2023

(65) Prior Publication Data

US 2023/0366535 A1 Nov. 16, 2023

(30) Foreign Application Priority Data

May 11, 2022 (JP) ................................ 2022-078089

(51) Int. Cl.

*F21V 33/00* (2006.01)
*B25B 21/02* (2006.01)
*B25B 23/18* (2006.01)
*B25F 5/00* (2006.01)
*H05B 47/105* (2020.01)
*H05B 47/155* (2020.01)

(52) U.S. Cl.

CPC .......... *F21V 33/0084* (2013.01); *B25B 21/02* (2013.01); *B25B 23/18* (2013.01); *B25F 5/001* (2013.01); *H05B 47/105* (2020.01); *H05B 47/155* (2020.01)

(58) Field of Classification Search

CPC ............................ F21V 33/0084; B25B 23/18
See application file for complete search history.

(56) References Cited

U.S. PATENT DOCUMENTS 6,033,087 A * 3/2000 Shozo ........................ F21V 5/04 362/244
2010/0038103 A1* 2/2010 Ueda ....................... B25B 21/00 173/217
2010/0149790 A1* 6/2010 Leong ..................... B25F 5/021 362/119
2011/0058356 A1* 3/2011 Friedman ................ B25F 5/021 362/119
2013/0021783 A1* 1/2013 Vanko ..................... B25B 21/00 362/119
2014/0036482 A1* 2/2014 Vanko ................. F21V 33/0084 362/119
2014/0124229 A1* 5/2014 Takahashi ............. B25B 21/026 173/93.5

(Continued)

*Primary Examiner* — Alexander K Garlen
(74) *Attorney, Agent, or Firm* — Oliff PLC

(57) ABSTRACT

A power tool includes a motor, an output shaft, a chip-on-board light emitting diode, and a light cover. The output shaft is rotated by a rotational force of the motor. The chip-on-board light emitting diode is disposed around the output shaft. The chip-on-board light emitting diode includes: a substrate having a circular ring portion; and an LED chip disposed on a front surface of the circular ring portion. The light cover is fixed to the substrate. The light cover includes: an inner cylindrical portion disposed radially inside with respect to the circular ring portion; and a light transmission portion through which light emitted from the LED chip passes. The inner cylindrical portion includes a cover slope that totally reflects light from the LED chip forward.

20 Claims, 23 Drawing Sheets

(56) References Cited

U.S. PATENT DOCUMENTS

| | | | | |
|---|---|---|---|---|
| 2016/0354889 | A1* | 12/2016 | Ely | B23Q 17/2404 |
| 2018/0126538 | A1* | 5/2018 | Qiu | G02B 6/0021 |
| 2021/0222866 | A1* | 7/2021 | Niwa | F21V 33/008 |
| 2022/0388141 | A1* | 12/2022 | Xu | B25B 23/18 |
| 2023/0147598 | A1* | 5/2023 | Tamura | B25B 23/18 81/54 |

* cited by examiner

POWER TOOL

CROSS-REFERENCE

The present application claims priority to and incorporates by reference the entire contents of Japanese Patent Application No. 2022-078089 filed in Japan on May 11, 2022.

TECHNICAL FIELD

The technology disclosed in the present specification relates to a power tool.

BACKGROUND ART

In the technical field related to power tools, a known illumination system for a power tool is disclosed in US 2016/0354889 A.

In US 2016/0354889 A, the illumination system for a power tool includes a chip-on-board light emitting diode (COB LED). The chip-on-board light emitting diode emits (outputs) a higher amount of light and brightly illuminates a work target or a work space. On the other hand, there is room for improvement in an irradiation state of light emitted from the chip-on-board light emitting diode disclosed in US 2016/0354889 A. For example, there is a demand for the chip-on-board light emitting diode to illuminate the work target with a uniform illuminance distribution or to illuminate the work target with an appropriate illuminance.

An object of the present disclosure is to disclose techniques for improving an irradiation state of light emitted from a chip-on-board light emitting diode.

SUMMARY OF THE INVENTION

In one non-limiting aspect of the present disclosure, a power tool may include a motor, an output shaft, a chip-on-board light emitting diode, and a light cover. The output shaft may be rotated by a rotational force of the motor. The chip-on-board light emitting diode may be disposed around the output shaft. The chip-on-board light emitting diode may include: a substrate having a circular ring portion; and an LED chip disposed on a front surface of the circular ring portion. The light cover may be fixed to the substrate. The light cover may include: an inner cylindrical portion disposed radially inside with respect to the circular ring portion; and a light transmission portion through which light emitted from the LED chip passes. The inner cylindrical portion may include a cover slope that totally reflects light from the LED chip forward.

DETAILED DESCRIPTION OF THE INVENTION

Figure 1:
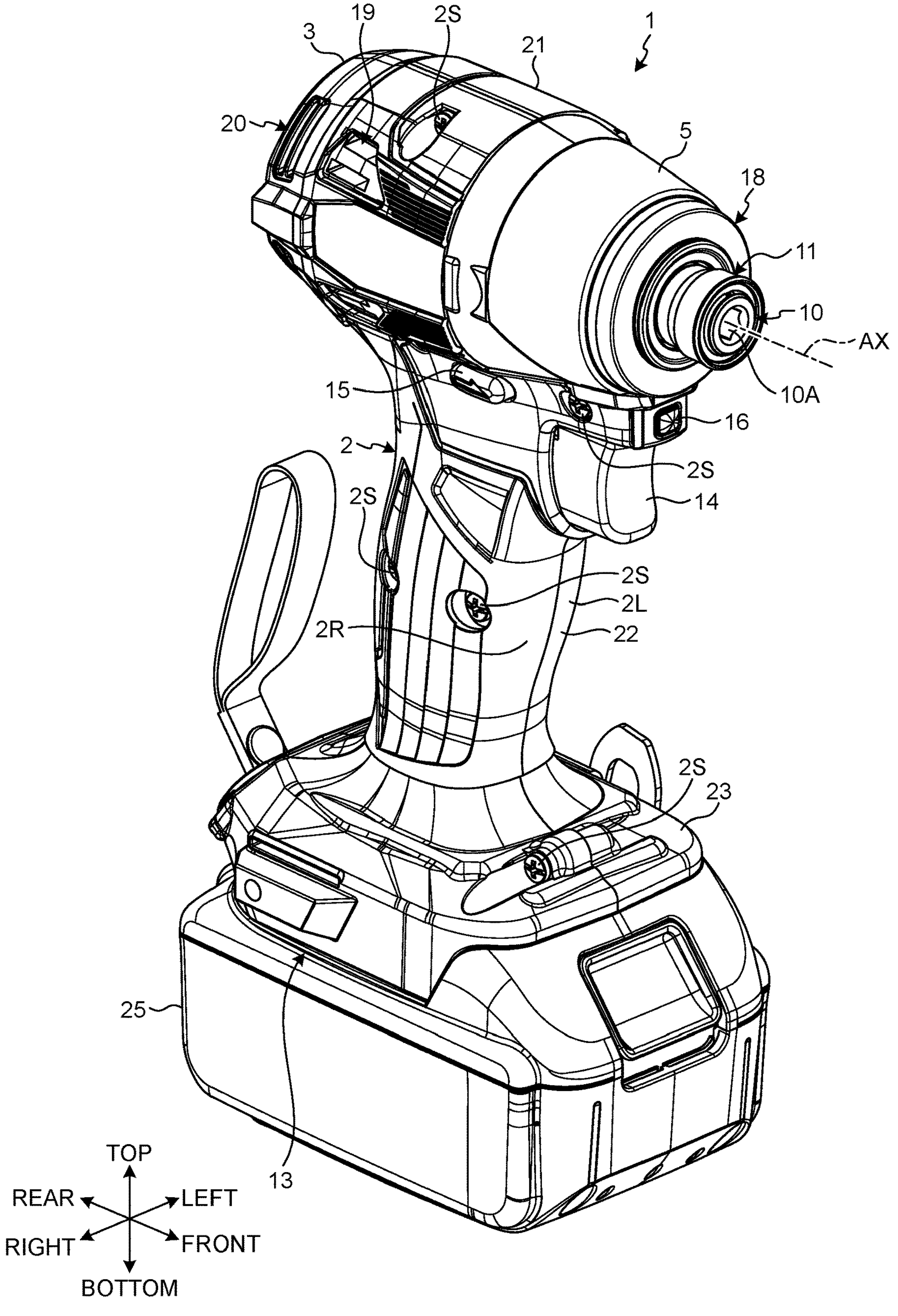
FIG. 1 is an oblique view, viewed from the front, which illustrates a power tool according to a first embodiment.

In one or more embodiments, a power tool may include a motor, an output shaft, a chip-on-board light emitting diode, and a light cover. The output shaft may be rotated by a rotational force of the motor. The chip-on-board light emitting diode may be disposed around the output shaft. The chip-on-board light emitting diode may include: a substrate having a circular ring portion; and an LED chip disposed on a front surface of the circular ring portion. The light cover may be fixed to the substrate. The light cover may include: an inner cylindrical portion disposed radially inside with respect to the circular ring portion; and a light transmission portion through which light emitted from the LED chip passes. The inner cylindrical portion may include a cover slope that totally reflects light from the LED chip forward.

According to the above configuration, since the cover slope that totally reflects light from the LED chip forward is provided in the inner cylindrical portion of the light cover, the loss of an amount of light output from the chip-on-board light emitting diode is suppressed. Since the loss of the light amount is suppressed, the chip-on-board light emitting diode can illuminate a work target with appropriate illuminance.

As a result, an irradiation state of the light emitted from the chip-on-board light emitting diode is improved.

In one or more embodiments, the cover slope may be inclined forward toward a radial inside.

According to the above configuration, since the LED chip is disposed radially outside and rear side with respect to the cover slope, the cover slope is inclined forward toward the radial inside, whereby the cover slope can totally reflect the light from the LED chip forward.

In one or more embodiments, the light transmission portion may include a light entrance surface facing the LED chip and a light exit surface from which light emitted from the LED chip and incident on the light entrance surface is output. At least a part of the light incident on the light entrance surface may pass through an interior of the light cover and reach the cover slope. The light totally reflected by the cover slope may be output from the light exit surface.

According to the above configuration, the light from the LED chip passes through the interior of the light cover and enters the cover slope at a predetermined incident angle, whereby the light is totally reflected by the cover slope.

In one or more embodiments, the light entrance surface may be inclined forward toward a radial inside.

According to the above configuration, at least a part of the light emitted from the LED chip is output from the light exit surface so as to diffuse radially outward.

In one or more embodiments, the power tool may include a speed reduction mechanism configured to transmit a rotational force of the motor to the output shaft, and a gear case that accommodates therein the speed reduction mechanism. The gear case may include a rear cylindrical portion that accommodates therein the speed reduction mechanism, a front cylindrical portion that holds a bearing that supports the output shaft, and an annular portion that connects a front end portion of the rear cylindrical portion and a rear end portion of the front cylindrical portion. The chip-on-board light emitting diode may be disposed around the front cylindrical portion. The inner cylindrical portion may be disposed around the front cylindrical portion and fixed to the front cylindrical portion.

According to the above configuration, the chip-on-board light emitting diode is fixed to the front cylindrical portion of the gear case via the light cover.

In one or more embodiments, the front cylindrical portion may include a protrusion protruding radially outward from an outer circumferential surface of the front cylindrical portion. The inner cylindrical portion may include a recess in which the protrusion is disposed.

According to the above configuration, the chip-on-board light emitting diode is fixed to the front cylindrical portion of the gear case via the light cover.

In one or more embodiments, the cover slope may define at least a part of the recess.

According to the above configuration, the cover slope is provided in the recess.

In one or more embodiments, the protrusion may include a case slope facing the cover slope.

According to the above configuration, the connection between the front cylindrical portion and the inner cylindrical portion is stabilized.

In one or more embodiments, a rear slide portion and a front slide portion disposed forward of the rear slide portion may be provided on an inner circumferential surface of the inner cylindrical portion. The rear slide portion and the front slide portion may each protrude radially inward from the inner circumferential surface of the inner cylindrical portion. The recess may be provided between the rear slide portion and the front slide portion. The cover slope may be provided on the front slide portion.

According to the above configuration, the recess is defined by the rear slide portion and the front slide portion.

In one or more embodiments, a plurality of the rear slide portions may be provided at intervals in a circumferential direction of the inner cylindrical portion. A plurality of the front slide portions may be respectively disposed forward of the plurality of rear slide portions. An insertion port may be provided between one end of the rear slide portion in a circumferential direction and the front slide portion. The protrusion may be disposed in the recess via the insertion port.

According to the above configuration, the protrusion is disposed in the recess via the insertion port.

In one or more embodiments, the light cover and the gear case may be fixed to one another by inserting the protrusion into the recess, and the insertion of the protrusion into the recess may be done by rotating the light cover after inserting the protrusion into the insertion port.

According to the above configuration, the light cover and the gear case are fixed to one another by relatively rotating the light cover and the gear case.

In one or more embodiments, the light cover may include an outer cylindrical portion disposed radially outside with respect to the circular ring portion. The light transmission portion may be disposed so as to connect a front end portion of the outer cylindrical portion and a front end portion of the inner cylindrical portion.

According to the above configuration, since the outer cylindrical portion of the light cover is disposed radially outside with respect to the circular ring portion, and the inner cylindrical portion of the light cover is disposed radially inside with respect to the circular ring portion, the connection between the substrate and the light cover is stabilized.

In one or more embodiments, the output shaft may include an anvil. The power tool may include an impact mechanism to which a rotational force of the motor is transmitted via the speed reduction mechanism and that impacts the anvil in a rotation direction. The gear case may be a hammer case that accommodates therein the speed reduction mechanism and the impact mechanism.

According to the above configuration, the chip-on-board light emitting diode is applied to an impact tool.

In one or more embodiments, the light transmission portion may include a light entrance surface facing the LED chip and a light exit surface from which light emitted from the LED chip and incident on the light entrance surface is output. At least a part of the light incident on the light entrance surface may pass through an interior of the light cover and reach the cover slope. The light totally reflected by the cover slope may be output through the light exit surface. An uneven portion may be formed on the light entrance surface.

According to the above configuration, since the uneven portion is formed on the light entrance surface, the light emitted from the LED chip is diffused on the light entrance surface. As a result, the work target is illuminated with a uniform illuminance distribution. Therefore, the irradiation state of the light emitted from the chip-on-board light emitting diode is improved.

In one or more embodiments, the power tool may include: a motor; an output shaft that is rotated by a rotational force of the motor; a chip-on-board light emitting diode disposed around the output shaft, the chip-on-board light emitting diode including a substrate having a circular ring portion and an LED chip disposed on a front surface of the circular ring portion; a light cover fixed to the substrate, the light cover including a light transmission portion through which light emitted from the LED chip passes. The light transmission portion may include a light entrance surface facing the LED chip and a light exit surface from which light emitted from the LED chip and incident on the light entrance surface is output. An uneven portion may be formed on the light entrance surface.

According to the above configuration, since the uneven portion is formed on the light entrance surface, the light emitted from the LED chip is diffused on the light entrance surface. As a result, the work target is illuminated with a uniform illuminance distribution. Therefore, the irradiation state of the light emitted from the chip-on-board light emitting diode is improved.

In one or more embodiments, the power tool may include: a motor; an output shaft that is rotated by a rotational force of the motor; a chip-on-board light emitting diode disposed around the output shaft; an illuminance sensor; and an LED control circuit configured to control an irradiation state of light emitted from the chip-on-board light emitting diode based on a detection value of the illuminance sensor.

According to the above configuration, since the LED control circuit controls the irradiation state of the light emitted from the chip-on-board light emitting diode based on the detection value of the illuminance sensor, the work target is illuminated with appropriate illuminance. Therefore, the irradiation state of the light emitted from the chip-on-board light emitting diode is improved.

In one or more embodiments, the illuminance sensor may receive light, which is emitted from an LED chip and reflected by a work target. In a case where it is determined that the detection value of the illuminance sensor exceeds a predetermined allowable value, the LED control circuit may reduce the amount of light emitted from the LED chip.

According to the above configuration, the work target is illuminated with appropriate illuminance. In a case where the amount of light output from the chip-on-board light emitting diode is large, the amount of light reflected by the work target also increases. In a case where the amount of light reflected by the work target is large, a worker may feel dazzled, and may feel uncomfortable or the workability may be deteriorated. In a case where the amount of light reflected by the work target is large enough for the worker to feel glare, that is, in a case where the detection value of the illuminance sensor exceeds a predetermined allowable value, the LED control circuit reduces the amount of light emitted from the LED chip. As a result, the work target is illuminated with appropriate illuminance, and the worker is prevented from feeling dazzled by the light reflected by the work target. As a result, an irradiation state of the light emitted from the chip-on-board light emitting diode is improved.

In one or more embodiments, a plurality of the LED chips may be provided. The illuminance sensor may receive light emitted from each of the plurality of LED chips and reflected by a work target. When determining that the detection value of the illuminance sensor exceeds a predetermined allowable value, the LED control circuit may stop light emission of some of the plurality of LED chips.

According to the above configuration, in a case where the amount of light reflected by the work target is large enough for the worker to feel glare, that is, in a case where the detection value of the illuminance sensor exceeds a predetermined allowable value, the LED control circuit may stop light emission of some of the plurality of LED chips. As a result, the work target is illuminated with appropriate illuminance, and the worker is prevented from feeling dazzled by the light reflected by the work target. As a result, an irradiation state of the light emitted from the chip-on-board light emitting diode is improved.

In one or more embodiments, the power tool may include: a speed reduction mechanism configured to transmit a rotational force of the motor to the output shaft; a gear case that accommodates therein the speed reduction mechanism; and a trigger lever configured to be operated to start the motor. The illumination sensor may be disposed between the gear case and the trigger lever.

According to the above configuration, the illuminance sensor can receive the light emitted from the chip-on-board light emitting diode and reflected by the work target.

In one or more embodiments, the power tool may include a sensor cover disposed forward of the illuminance sensor. The illuminance sensor may receive light through an opening provided in the sensor cover.

According to the above configuration, ambient light is prevented from entering the illuminance sensor. The illuminance sensor can properly receive light reflected by the work target.

Hereinafter, embodiments will be described with reference to the drawings. In the embodiments, a positional relationships among parts will be described using the terms "left", "right", "front", "rear", "up", and "down". These terms indicate the relative positions or directions, using the center of a power tool as a reference.

First Embodiment

Power Tool

Figure 2:
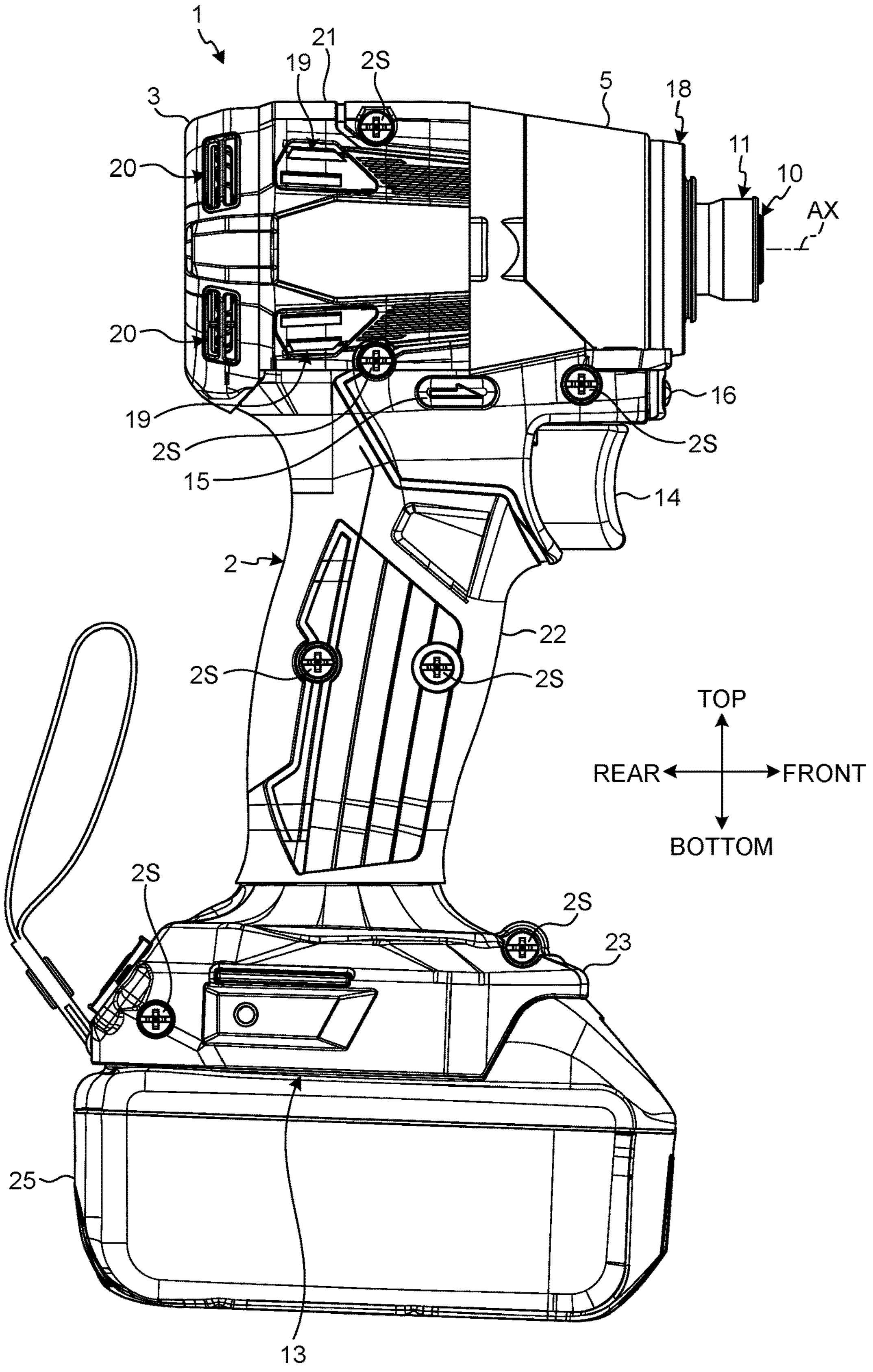
FIG. 2 is a side view illustrating the power tool according to the first embodiment.
Figure 3:
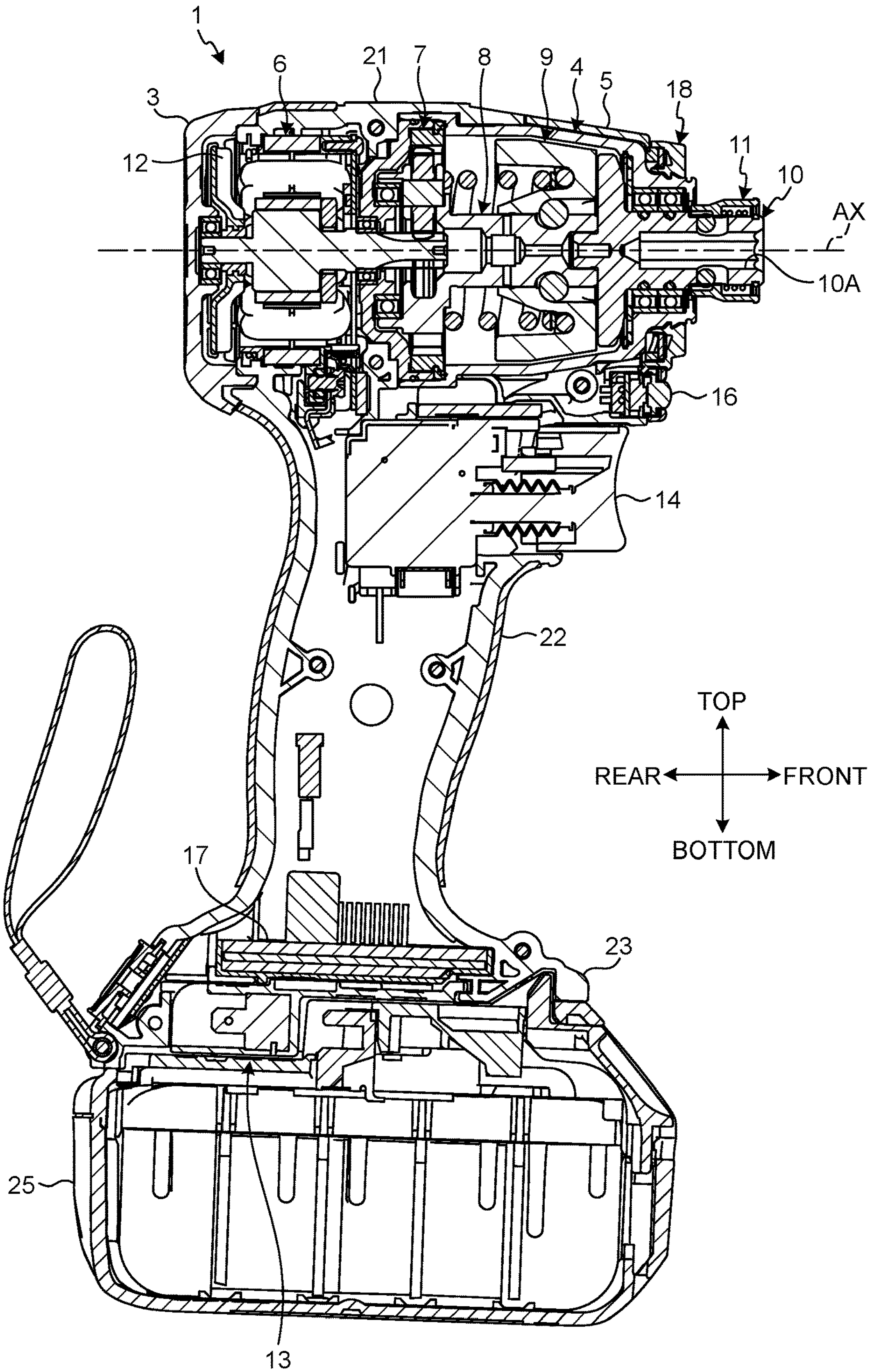
FIG. 3 is a cross-sectional view illustrating the power tool according to the first embodiment.
Figure 4:
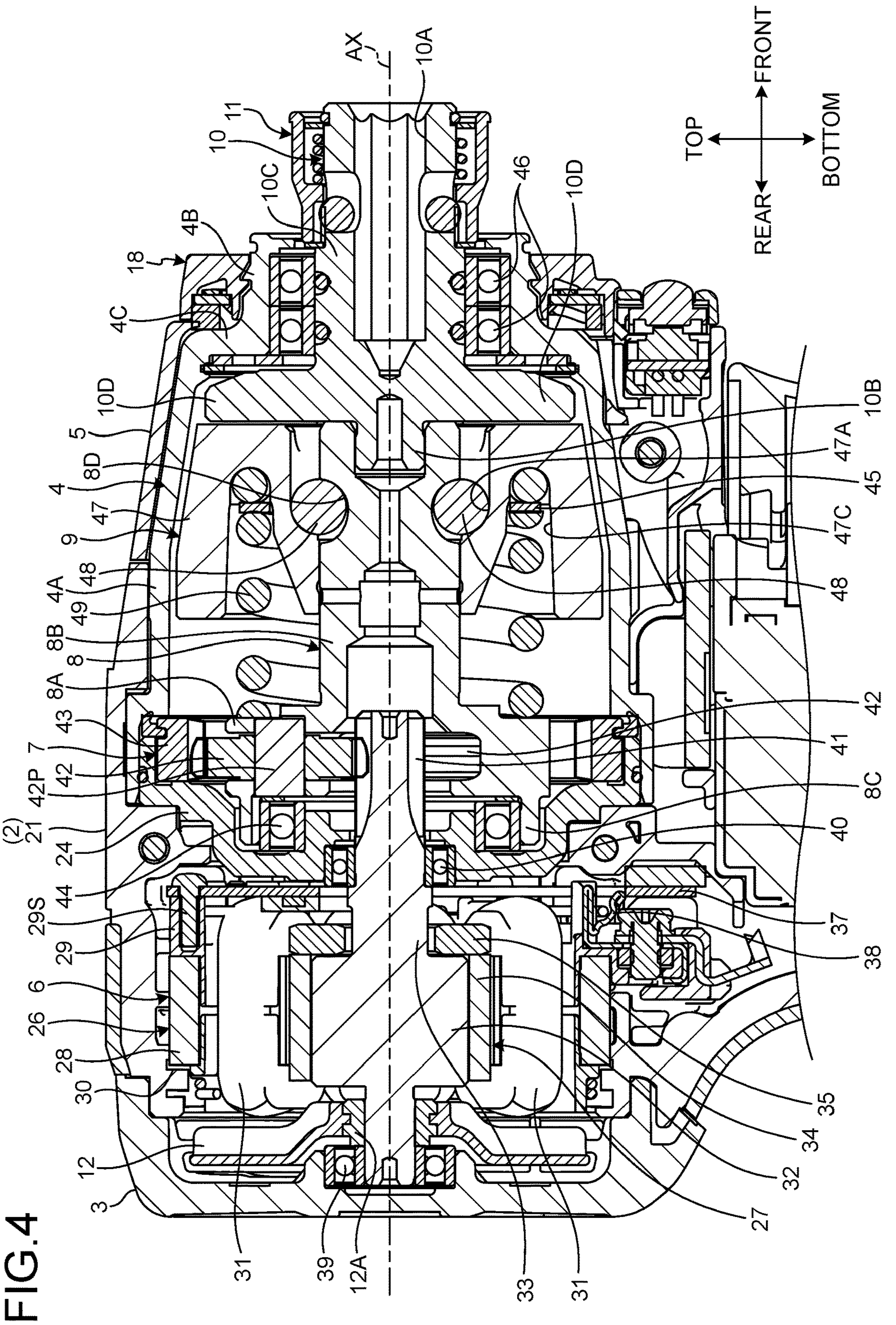
FIG. 4 is a cross-sectional view illustrating an upper portion of the power tool according to the first embodiment.

FIG. 1 is an oblique view, viewed from the front, which illustrates a power tool 1 according to the present embodiment. FIG. 2 is a side view illustrating the power tool 1 according to the present embodiment. FIG. 3 is a cross-sectional view illustrating the power tool 1 according to the present embodiment. FIG. 4 is a cross-sectional view illustrating an upper portion of the power tool 1 according to the present embodiment.

In the present embodiment, the power tool 1 is a power tool having an electric motor 6 as a power source. A direction parallel to a rotation axis AX of the motor 6 is appropriately referred to as an axial direction, a direction around the rotation axis AX is appropriately referred to as a circumferential direction or a rotation direction, and a radial direction of the rotation axis AX is appropriately referred to as a radial direction. In the radial direction, a position close to or a direction approaching the rotation axis AX is appropriately referred to as radially inward, and a position far from or a direction away from the rotation axis AX is appropriately referred to as radially outward. In the present embodiment, the rotation axis AX extends in a front-rear direction. One side in the axial direction is a front side, and the other side in the axial direction is a rear side.

In the present embodiment, the power tool 1 is assumed to be an impact tool which is a type of power tool. In the following description, the power tool 1 is appropriately referred to as an impact tool 1.

In the present embodiment, the impact tool 1 is an impact driver which is a type of screw fastening tool. The impact tool 1 includes a housing 2, a rear cover 3, a hammer case 4, a case cover 5, the motor 6, a speed reduction mechanism 7, a spindle 8, an impact mechanism 9, an anvil 10, a tool holding mechanism 11, a fan 12, a battery mounting unit 13, a trigger lever 14, a forward/reverse switching lever 15, a hand mode switching button 16, a controller 17, and a light unit 18.

The housing 2 is made of synthetic resin. In the present embodiment, the housing 2 is made of nylon. The housing 2 includes a left housing 2L and a right housing 2R disposed on a right side of the left housing 2L. The left housing 2L and the right housing 2R are fixed by a plurality of screws 2S. The housing 2 includes a pair of half-split housings.

The housing 2 includes a motor housing portion 21, a grip portion 22, and a battery holder 23.

The motor housing portion 21 is cylindrical. The motor housing portion 21 houses therein the motor 6, a part of a bearing box 24, and a rear portion of the hammer case 4.

The grip portion 22 protrudes downward from the motor housing portion 21. The trigger lever 14 is provided above the grip portion 22. The grip portion 22 is held by an operator.

The battery holder 23 is connected to a lower end portion of the grip portion 22. In each of the front-rear direction and the left-right direction, an outer dimension of the battery holder 23 is larger than an outer dimension of the grip portion 22.

The rear cover 3 is made of synthetic resin. The rear cover 3 is disposed rearward of the motor housing portion 21. The rear cover 3 houses at least a part of the fan 12. The fan 12 is disposed on an inner-circumference side of the rear cover 3. The rear cover 3 is disposed such that it covers an opening in a rear end portion of the motor housing portion 21.

The motor housing portion 21 has air-intake ports 19. The rear cover 3 has air-exhaust ports 20. Air from outside of the housing 2 flows into an interior space of the housing 2 via the air-intake ports 19. Air from the interior space of the housing 2 flows out to the outside of the housing 2 via the air-exhaust ports 20.

The hammer case 4 functions as a gear case that accommodates therein the speed reduction mechanism 7. The hammer case 4 accommodates therein at least a part of the speed reduction mechanism 7, the spindle 8, the impact mechanism 9, and the anvil 10. The hammer case 4 is made of a metal. In the present embodiment, the hammer case 4 is made of aluminum. The hammer case 4 has a cylindrical shape.

The hammer case 4 includes a rear cylindrical portion 4A, a front cylindrical portion 4B, and an annular portion 4C. The front cylindrical portion 4B is disposed in front of the rear cylindrical portion 4A. An outer diameter of the rear cylindrical portion 4A is larger than an outer diameter of the front cylindrical portion 4B. An inner diameter of the rear cylindrical portion 4A is larger than an inner diameter of the front cylindrical portion 4B. The annular portion 4C is disposed so as to connect a front end portion of the rear cylindrical portion 4A and a rear end portion of the front cylindrical portion 4B.

The hammer case 4 is connected to a front portion of the motor housing portion 21. The bearing box 24 is fixed to a rear portion of the rear cylindrical portion 4A. At least a part of the speed reduction mechanism 7 is disposed inside the bearing box 24. A screw thread is formed on an outer-circumferential portion of the bearing box 24. A screw groove is formed in an inner-circumferential portion of the rear portion of the rear cylindrical portion 4A. The bearing box 24 and the hammer case 4 are fixed to one another by joining the screw thread of the bearing box 24 and the screw groove of the rear cylindrical portion 4A. The hammer case 4 is sandwiched between the left housing 2L and the right housing 2R. A part of the bearing box 24 and the rear portion of the rear cylindrical portion 4A are housed in the motor housing portion 21. The bearing box 24 is fixed to the motor housing portion 21 and the hammer case 4.

The case cover 5 covers at least a part of a surface of the hammer case 4. In the present embodiment, the case cover 5 covers a surface of the rear cylindrical portion 4A. The case cover 5 is made of synthetic resin. In the present embodiment, the case cover 5 is made of polycarbonate resin. The case cover 5 protects the hammer case 4. The case cover 5 blocks contact between the hammer case 4 and an object around the impact tool 1. The case cover 5 blocks contact between the hammer case 4 and the operator.

The motor 6 is a power source of the impact tool 1. The motor 6 generates a rotational force. The motor 6 is an electric motor. The motor 6 is an inner-rotor-type brushless motor. The motor 6 includes a stator 26 and a rotor 27. The stator 26 is supported by the motor housing portion 21. At least a part of the rotor 27 is disposed inside the stator 26. The rotor 27 rotates relative to the stator 26. The rotor 27 rotates about the rotation axis AX extending in the front-rear direction.

The stator 26 includes a stator core 28, a front insulator 29, a rear insulator 30, and coils 31.

The stator core 28 is disposed radially outside with respect to the rotor 27. The stator core 28 includes a plurality of laminated steel plates. The steel plates are plates made of a metal containing iron as a main component. The stator core 28 has cylindrical shape. The stator core 28 includes teeth that respectively support the coils 31.

The front insulator 29 is provided at a front portion of the stator core 28. The rear insulator 30 is provided at a rear portion of the stator core 28. The front insulator 29 and the rear insulator 30 each are an electrically insulating member made of a synthetic resin. The front insulator 29 is disposed so as to cover some of the teeth surfaces. The rear insulator 30 is disposed so as to cover some of the teeth surfaces.

The coils 31 are mounted on the stator core 28 via the front insulator 29 and the rear insulator 30. The coils 31 are disposed around the teeth of the stator core 28 via the front insulator 29 and the rear insulator 30. The coils 31 and the stator core 28 are electrically insulated from one another by the front insulator 29 and the rear insulator 30. The coils 31 are electrically connected via a fusing terminal 38.

The rotor 27 rotates about the rotation axis AX. The rotor 27 includes a rotor core portion 32, a rotor shaft portion 33, at least one rotor magnet 34, and at least one sensor magnet 35.

The rotor core portion 32 and the rotor shaft portion 33 each are made of steel. In the present embodiment, the rotor core portion 32 and the rotor shaft portion 33 are integrated. A front portion of the rotor shaft portion 33 protrudes forward from a front end surface of the rotor core portion 32. A rear portion of the rotor shaft portion 33 protrudes rearward from a rear end surface of the rotor core portion 32.

The rotor magnet 34 is fixed to the rotor core portion 32. The rotor magnet 34 has a cylindrical shape. The rotor magnet 34 is disposed around the rotor core portion 32.

The sensor magnet 35 is fixed to the rotor core portion 32. The sensor magnet 35 has a circular ring shape. The sensor magnet 35 is disposed on the front end surface of the rotor core portion 32 and the front end surface of the rotor magnet 34.

A sensor substrate 37 is mounted on the front insulator 29. The sensor substrate 37 is fixed to the front insulator 29 by at least one screw 29S. The sensor substrate 37 includes a circular circuit board and a magnetic sensor supported by the circuit board. At least a part of the sensor substrate 37 faces the sensor magnet 35. The magnetic sensor detects a position of the sensor magnet 35 to detect a position of the rotor 27 in the rotation direction.

The rear portion of the rotor shaft portion 33 is rotatably supported by a rotor bearing 39. The front portion of the rotor shaft portion 33 is rotatably supported by a rotor bearing 40. The rotor bearing 39 is held by the rear cover 3. The rotor bearing 40 is held by the bearing box 24. The front end portion of the rotor shaft portion 33 is disposed in the interior space of the hammer case 4 through an opening of the bearing box 24.

A pinion gear 41 is formed at a front end portion of the rotor shaft portion 33. The pinion gear 41 is connected to at least a part of the speed reduction mechanism 7. The rotor shaft portion 33 is connected to the speed reduction mechanism 7 via the pinion gear 41.

The speed reduction mechanism 7 transmits a rotational force of the motor 6 to the spindle 8 and the anvil 10. The speed reduction mechanism 7 is accommodated in the rear cylindrical portion 4A of the hammer case 4. The speed reduction mechanism 7 includes a plurality of gears. The speed reduction mechanism 7 is disposed forward of the motor 6. The speed reduction mechanism 7 connects the rotor shaft portion 33 and the spindle 8. The gears of the speed reduction mechanism 7 are driven by the rotor 27. The speed reduction mechanism 7 transmits the rotation of the rotor 27 to the spindle 8. The speed reduction mechanism 7 causes the spindle 8 to rotate at a rotation speed that is lower than a rotation speed of the rotor shaft portion 33. The speed reduction mechanism 7 includes a planetary gear mechanism.

The speed reduction mechanism 7 includes a plurality of planetary gears 42 disposed around the pinion gear 41, and an internal gear 43 disposed around the plurality of planetary gears 42. The pinion gear 41, the planetary gears 42, and the internal gear 43 are each housed in the hammer case 4 and the bearing box 24. Each of the planetary gears 42 meshes with the pinion gear 41. The planetary gears 42 are rotatably supported on the spindle 8 via pins 42P. The spindle 8 is rotated by the planetary gears 42. The internal gear 43 has internal teeth, which mesh with the planetary gears 42. The internal gear 43 is fixed to the bearing box 24. The internal gear 43 is always non-rotatable relative to the bearing box 24.

When the rotor shaft portion 33 rotates in response to the driving of the motor 6, the pinion gear 41 rotates, and the planetary gears 42 revolve around the pinion gear 41. The planetary gears 42 revolve while meshing with the internal teeth of the internal gear 43. Owing to the revolving of the planetary gears 42, the spindle 8, which is connected to the planetary gears 42 via the pin 42P, rotates at a rotation speed that is lower than a rotation speed of the rotor shaft portion 33.

The spindle 8 is rotated by the rotational force of the motor 6. The spindle 8 is disposed forward of at least a part of the motor 6. The spindle 8 is disposed forward of the stator 26. At least a part of the spindle 8 is disposed forward of the rotor 27. At least a part of the spindle 8 is disposed forward of the speed reduction mechanism 7. The spindle 8 is rotated by the rotor 27. The spindle 8 is rotated by a rotational force of the rotor 27 transmitted by the speed reduction mechanism 7.

The spindle 8 includes a flange portion 8A and a spindle shaft portion 8B protruding forward from the flange portion 8A. The planetary gears 42 are rotatably supported by the flange portion 8A via the pins 42P. A rotation axis of the spindle 8 and the rotation axis AX of the motor 6 coincide with one another. The spindle 8 rotates about the rotation axis AX.

The spindle 8 is rotatably supported by a spindle bearing 44. The spindle bearing 44 is held by the bearing box 24. The spindle 8 has a circular ring portion 8C protruding rearward from a rear portion of the flange portion 8A. The spindle bearing 44 is disposed inside the circular ring portion 8C. In the present embodiment, an outer ring of the spindle bearing 44 is connected to the circular ring portion 8C, and an inner ring of the spindle bearing 44 is supported by the bearing box 24.

The impact mechanism 9 is driven by the motor 6. The rotational force of the motor 6 is transmitted to the impact mechanism 9 via the speed reduction mechanism 7 and the spindle 8. The impact mechanism 9 impacts the anvil 10 in the rotation direction owing to the rotational force of the spindle 8, which is rotated by the motor 6. The impact mechanism 9 includes a hammer 47, balls 48, and a coil spring 49. The impact mechanism 9 including the hammer 47 is housed in the hammer case 4.

The hammer 47 is disposed forward of the speed reduction mechanism 7. The hammer 47 is accommodated in the rear cylindrical portion 4A. The hammer 47 is disposed around the spindle shaft portion 8B. The hammer 47 is held by the spindle shaft portion 8B. The balls 48 are disposed between the spindle shaft portion 8B and the hammer 47. The coil spring 49 is supported by the flange portion 8A and the hammer 47.

The hammer 47 is rotated by the motor 6. The rotational force of the motor 6 is transmitted to the hammer 47 via the speed reduction mechanism 7 and the spindle 8. The hammer 47 is rotatable together with the spindle 8 owing to the rotational force of the spindle 8, which is rotated by the motor 6. A rotation axis of the hammer 47, the rotation axis of the spindle 8, and the rotation axis AX of the motor 6 coincide with one another. The hammer 47 rotates about the rotation axis AX.

The balls 48 are made of a metal such as steel. The balls 48 are disposed between the spindle shaft portion 8B and the hammer 47. The spindle 8 has a spindle groove 8D in which at least a part of the ball 48 is disposed. The spindle groove 8D is provided on a part of an outer surface of the spindle shaft portion 8B. The hammer 47 has a hammer groove 47A in which at least a part of the ball 48 is disposed. The hammer groove 47A is provided on a part of an inner surface of the hammer 47. The balls 48 are disposed between the spindle groove 8D and the hammer groove 47A. The balls 48 can roll along the inner side of the spindle groove 8D and the inner side of the hammer groove 47A. The hammer 47 is movable as the balls 48 roll. The spindle 8 and the hammer 47 can move relative to one another in the axial direction and the rotation direction within movable ranges defined by the spindle groove 8D and the hammer groove 47A.

The coil spring 49 generates an elastic (spring) force, which causes the hammer 47 to move forward. The coil spring 49 is disposed between the flange portion 8A and the hammer 47. A ring-shaped recess 47C is provided on a rear surface of the hammer 47. The recess 47C is recessed forward from the rear surface of the hammer 47. A washer 45 is provided on an inner side of the recess 47C. A rear end portion of the coil spring 49 is supported by the flange portion 8A. A front end portion of the coil spring 49 is disposed on the inner side of the recess 47C and is supported by the washer 45.

The anvil 10 is an output shaft of the impact tool 1 that rotates by the rotational force of the motor 6. At least a part of the anvil 10 is disposed forward of the hammer 47. The anvil 10 has a tool (bit) hole 10A into which a tool accessory, e.g., a bit, is inserted. The tool hole 10A is provided at a front end portion of the anvil 10. The tool accessory is mounted on the anvil 10. Furthermore, a protrusion 10B is provided at a rear end portion of the anvil 10. A recess is provided at a front end portion of the spindle shaft portion 8B. The protrusion 10B is inserted into the recess provided at the front end portion of the spindle shaft portion 8B.

The anvil 10 includes a rod-shaped anvil shaft portion 10C and an anvil projection 10D. The tool hole 10A is provided in a front end portion of the anvil shaft portion 10C. The tool accessory is mounted in (on) the anvil shaft portion 10C. The anvil projection 10D is provided at a rear end portion of the anvil 10. The anvil projection 10D projects radially outward from a rear end portion of the anvil shaft portion 10C.

The anvil 10 is rotatably supported by an anvil bearings 46. A rotation axis of the anvil 10, the rotation axis of the hammer 47, the rotation axis of the spindle 8, and the rotation axis AX of the motor 6 coincide with one another. The anvil 10 rotates about the rotation axis AX. The anvil bearings 46 are disposed in the interior of the front cylindrical portion 4B. The anvil bearings 46 are held by the front cylindrical portion 4B of the hammer case 4. The anvil bearings 46 support the anvil shaft portion 10C. In the present embodiment, two anvil bearings 46 are disposed in the front-rear direction.

At least a part of the hammer 47 is capable of coming into contact with the anvil projection 10D. A hammer projection projecting forward is provided at a front portion of the hammer 47. The hammer projection of the hammer 47 and the anvil projection 10D are capable of coming into contact with one another. When the motor 6 is driven (supplied with current) in a state where the hammer 47 and the anvil projection 10D are in contact with one another, the anvil 10 rotates together with the hammer 47 and the spindle 8.

The anvil 10 is impactable (strikable) in the rotation direction by the hammer 47. For example, during screw-fastening work, there are situations in which, when a load that acts on the anvil 10 becomes high, the anvil 10 can no longer be caused to rotate merely by the power generated by the motor. When the anvil 10 can no longer be caused to rotate merely by the power generated by the motor 6, the rotation of the anvil 10 and the hammer 47 will (temporarily) stop. As a result, the spindle 8 and the hammer 47 will move relative to one another in the axial direction and the circumferential direction via the balls 48. That is, even when the rotation of the hammer 47 (temporarily) stops, the rotation of the spindle 8 continues owing to the power generated by the motor 6. In the state where the rotation of the hammer 47 has stopped, when the spindle 8 rotates relative to the hammer 47, the balls 48 move rearward while being guided by the spindle groove 8D and the hammer groove 47A. The hammer 47 receives a force from the balls 48 and moves rearward along with the balls 48. That is, in a state where the rotation of the anvil 10 is stopped, the hammer 47 moves rearward in response to the rotation of the spindle 8. The contact between the hammer 47 and the anvil projection 10D is released by the movement of the hammer 47 rearward.

The coil spring 49 generates an elastic (spring) force, which causes the hammer 47 to move forward. The hammer 47, which had previously moved rearward, now moves forward owing to the elastic force of the coil spring 49. When the hammer moves forward, the hammer 47 receives a force in the rotation direction from the balls 48. That is, the hammer 47 moves forward while rotating. When the hammer 47 moves forward while rotating, the hammer 47 comes into contact with the anvil projection 10D while rotating. As a result, the anvil projection 10D is impacted in the rotation direction by the hammer 47. Both the power of the motor 6 and the inertial force of the hammer 47 act on the anvil 10. Therefore, the anvil 10 can be rotated about the rotation axis AX with a high torque.

The tool holding mechanism 11 is disposed around the front portion of the anvil 10. The tool holding mechanism 11 holds the tool accessory, which is inserted into the tool hole 10A.

The fan 12 is rotated by the rotational force of the motor 6. The fan 12 is disposed rearward of the stator 26 of the motor 6. The fan 12 generates an airflow for cooling the motor 6. The fan 12 is fixed to at least a part of the rotor 27. The fan 12 is fixed to the rear portion of the rotor shaft portion 33 via a bush 12A. The fan 12 is disposed between the rotor bearing 39 and the stator 26. The fan 12 rotates when the rotor 27 rotates. When the rotor shaft portion 33 rotates, the fan 12 rotates together with the rotor shaft portion 33. When the fan 12 rotates, air from outside of the housing 2 flows into the interior space of the housing 2 through the air-intake ports 19. The air that has flowed into the interior space of the housing 2 flows through the interior space of the housing 2, thereby cooling the motor 6. The air that has flowed through the interior space of the housing 2 flows out to the outside of the housing 2 via the air-exhaust ports 20 while the fan 12 is rotating.

The battery mounting unit 13 is disposed at a lower portion of the battery holder 23. The battery mounting unit 13 is connected to a battery pack 25. The battery pack 25 is mounted on the battery mounting unit 13. The battery pack 25 is detachable from the battery mounting unit 13. The battery pack 25 functions as a power supply of the impact tool 1. The battery pack 25 includes one or more secondary batteries. In the present embodiment, the battery pack 25 includes one or more rechargeable lithium-ion batteries. After being mounted on the battery mounting unit 13, the battery pack 25 can supply electric power to the impact tool 1. The motor 6 and the light unit 18 is driven based on the electric power (current) supplied from the battery pack 25.

The trigger lever 14 is provided on the grip portion 22. The trigger lever 14 is operated by an operator to start the motor 6. The motor 6 is changed between driving and stoppage in response to operating of the trigger lever 14.

The forward/reverse switching lever 15 is provided at an upper portion of the grip portion 22. The forward/reverse switching lever 15 is operated by an operator. In response to the operation of the forward/reverse switching lever 15, the rotation direction of the motor 6 is changed from one of a forward-rotational direction and a reverse-rotational direction to the other. When the rotation direction of the motor 6 is changed, the rotational direction of the spindle 8 is changed.

The hand mode switching button 16 is provided at an upper portion of the trigger lever 14. The hand mode switching button 16 can be operated (pressed) by an operator. A control mode of the motor 6 is changed in response to the operation of the hand mode switching button 16.

The controller 17 outputs control signals, which control at least the motor 6 and the light unit 18. The controller 17 is accommodated in the battery holder 23. The controller 17 changes the control mode of the motor 6 based on the work content required to be performed by the impact tool 1. The control mode of the motor 6 refers to a control method or a control pattern of the motor 6. The controller 17 includes a circuit board on which a plurality of electronic components are mounted. Examples of the electronic components mounted on the circuit board include: a processor such as a central processing unit (CPU); nonvolatile memory such as a read only memory (ROM) or storage; volatile memory such as a random access memory (RAM); transistors, and resistors.

Light Unit

The light unit 18 emits illumination light. The light unit 18 illuminates the anvil 10 and the periphery of the anvil 10 with illumination light. The light unit 18 illuminates the front of the anvil 10 with illumination light. Furthermore, the light unit 18 illuminates the tool accessory attached to the anvil 10 and the periphery of the tool accessory with illumination light.

The light unit 18 is disposed at the front portion of the hammer case 4. The light unit 18 is disposed around the front cylindrical portion 4B.

The light unit 18 includes a chip-on-board light emitting diode (COB LED).

Figure 5:
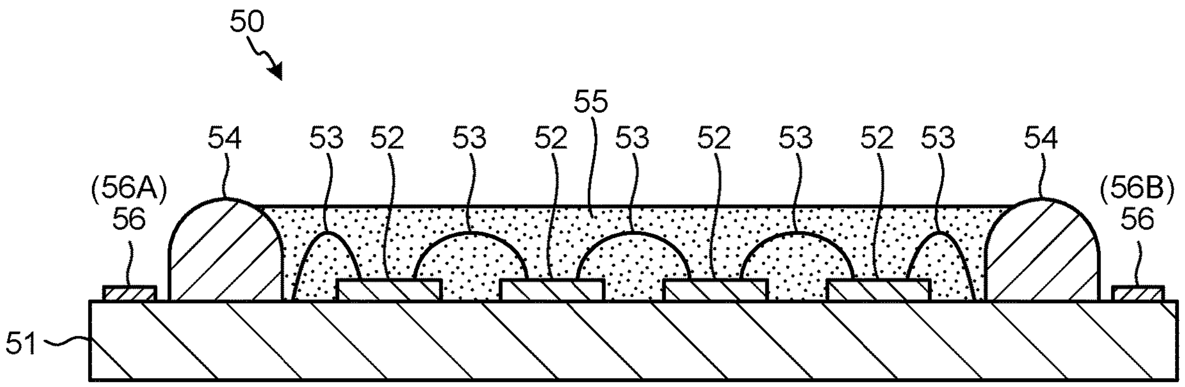
FIG. 5 is a diagram schematically illustrating a chip-on-board light emitting diode according to the first embodiment.

FIG. 5 is a diagram schematically illustrating a chip-on-board light emitting diode 50 according to the present embodiment. The chip-on-board light emitting diode 50 includes a substrate 51, LED chips 52, gold wires 53, a bank 54, a phosphor (phosphor coating) 55, and a pair of electrodes 56. Examples of the substrate 51 include: an aluminum substrate, a woven fiberglass reinforced epoxy substrate (FR-4 substrate), and a composite epoxy material substrate (CEM-3 substrate). The LED chips 52 are mounted on a surface of the substrate 51. The gold wires 53 connect the LED chips 52 and the substrate 51. The gold wires 53 connect the LED chips 52 to one another. The bank 54 is provided on the surface of the substrate 51. The bank 54 is disposed around the LED chips 52. The bank 54 defines a compartment space in which the phosphor 55 is disposed. The phosphor 55 is disposed on the inner side of the bank 54 so as to cover the LED chips 52. Each of the electrodes 56 is disposed on the surface of the substrate 51 on the outer side of the bank 54. The electrodes 56 may be disposed on a back surface of the substrate 51. Among the electrodes 56, one electrode 56 is a positive electrode 56A, and the other electrode 56 is a negative electrode 56B. The electrodes 56 are connected to the battery pack 25 via the controller 17 and lead wires. The power output from the battery pack 25 is supplied to the electrodes 56 via the controller 17 and the lead wires. The power supplied to the electrodes 56 is supplied to the LED chips 52 via the substrate 51 and the gold wires 53. The LED chips 52 emit light owing to the power supplied from the battery pack 25. A voltage, which has been stepped down to 5 V, of the battery pack 25 is applied to the LED chips 52.

Figure 6:
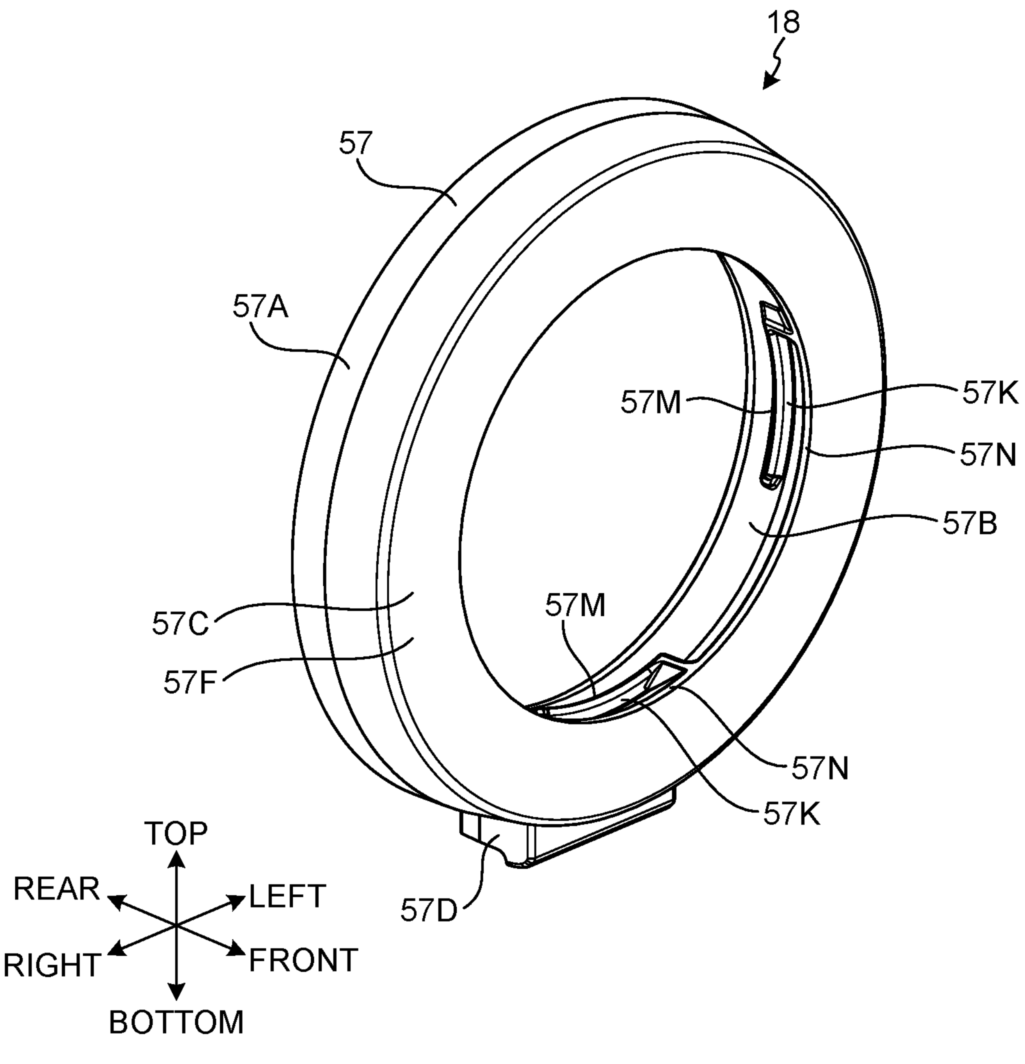
FIG. 6 is an oblique view, viewed from the front, which illustrates a light unit according to the first embodiment.
Figure 7:
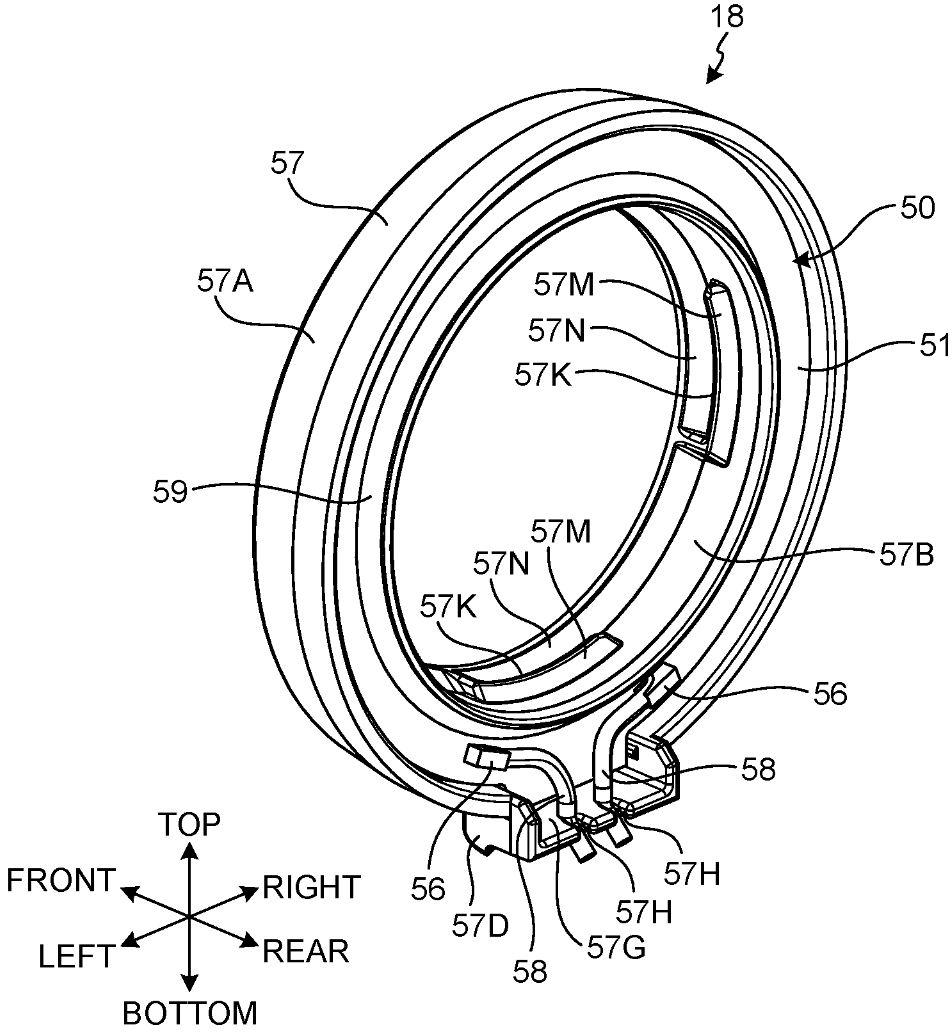
FIG. 7 is an oblique view, viewed from the rear, which illustrates the light unit according to the first embodiment.
Figure 8:
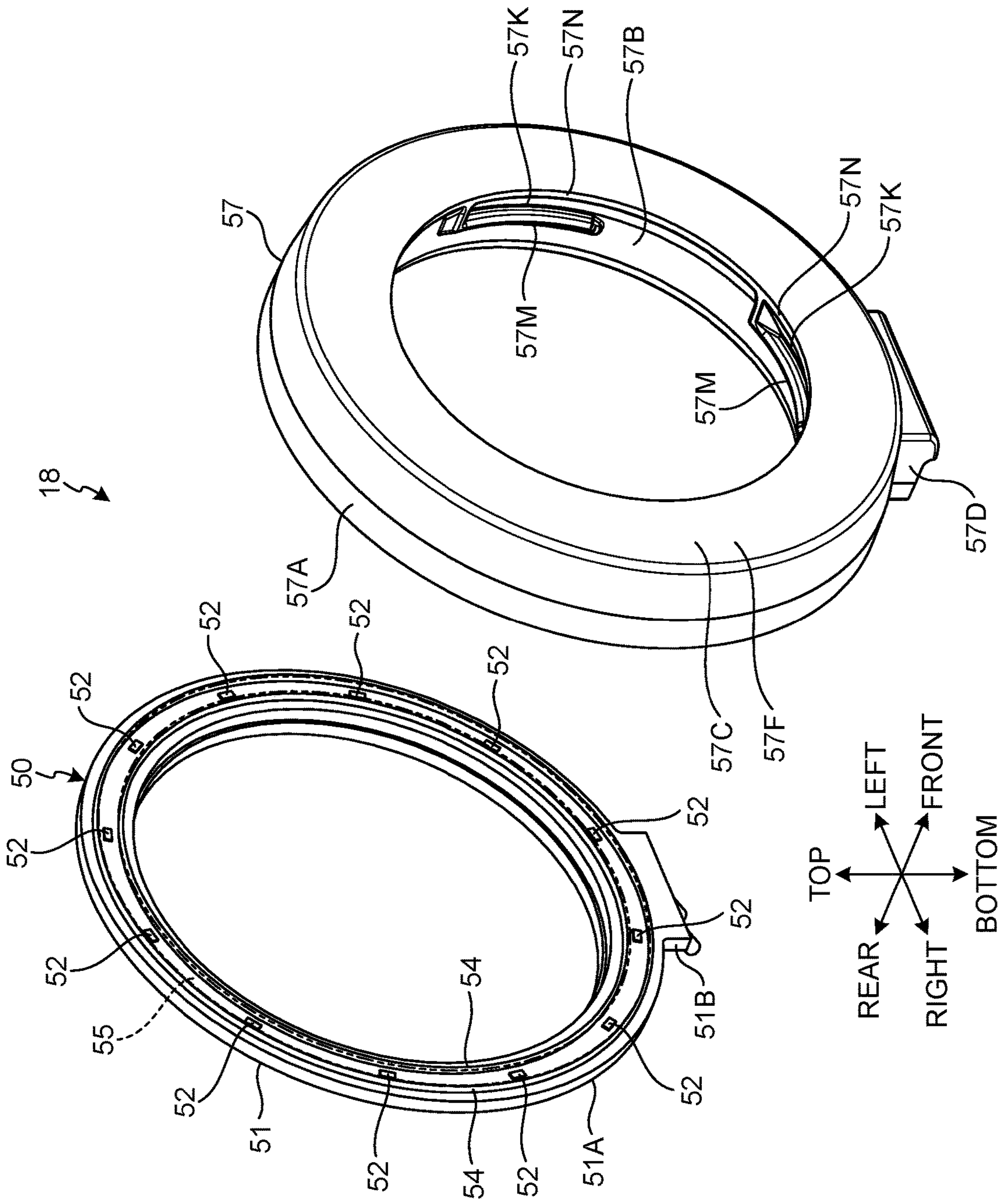
FIG. 8 is an exploded oblique view, viewed from the front, which illustrates the light unit according to the first embodiment.
Figure 9:
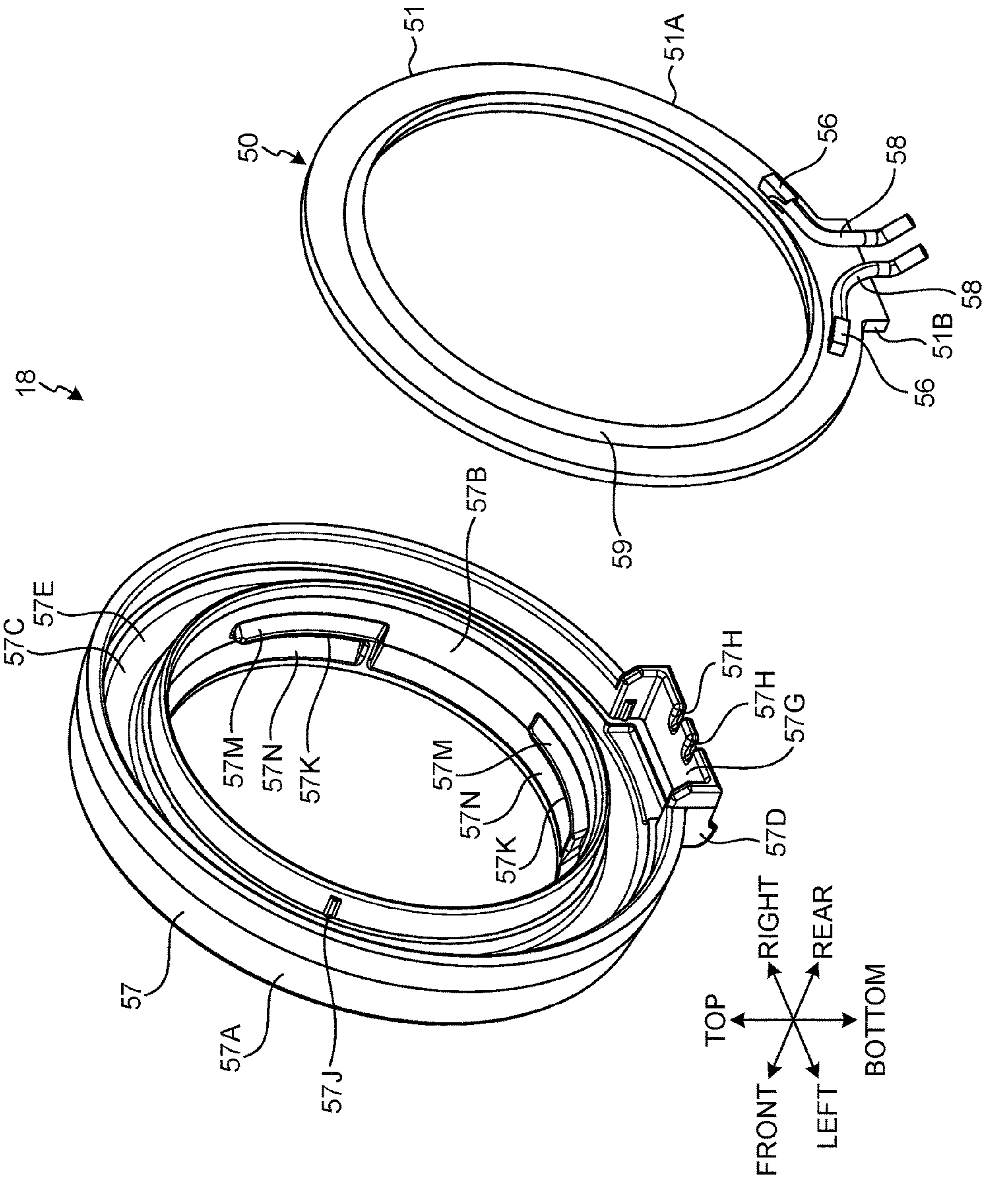
FIG. 9 is an exploded oblique view, viewed from the rear, which illustrates the light unit according to the first embodiment.

FIG. 6 is an oblique view, viewed from the front, which illustrates the light unit 18 according to the present embodiment. FIG. 7 is an oblique view, viewed from the rear, which illustrates the light unit 18 according to the present embodiment. FIG. 8 is an exploded oblique view, viewed from the front, which illustrates the light unit 18 according to the present embodiment. FIG. 9 is an exploded oblique view, viewed from the rear, which illustrates the light unit 18 according to the present embodiment.

As illustrated in FIGS. 6, 7, 8, and 9, the light unit 18 includes the chip-on-board light emitting diode 50 and a light cover 57. The chip-on-board light emitting diode 50 includes the substrate 51, the plurality of LED chips 52, the bank 54, the phosphor 55, and the pair of electrodes 56.

The substrate 51 has an annular shape. The substrate 51 includes a circular ring portion 51A and a support portion 51B protruding downward from a lower portion of the circular ring portion 51A.

The LED chips 52 are arranged on a front surface of the circular ring portion 51A of the substrate 51. The LED chips 52 are arranged at intervals in a circumferential direction of the circular ring portion 51A. In the present embodiment, twelve LED chips 52 are arranged at equal intervals in the circumferential direction of the circular ring portion 51A.

The bank 54 is provided on the front surface of the circular ring portion 51A of the substrate 51. The bank 54 protrudes forward from the front surface of the circular ring portion 51A. The bank 54 has a circular ring shape. In the present embodiment, the bank 54 is provided in a double circular ring shape as illustrated in FIG. 8. That is, in the present embodiment, the bank 54 includes a first bank 54 and a second bank 54 disposed radially outside with respect to the first bank 54. The first bank 54 is disposed radially inside with respect to the LED chips 52. The second bank 54 is disposed radially outside with respect to the LED chips 52.

The phosphor 55 is disposed on the front surface of the circular ring portion 51A of the substrate 51. The phosphor 55 has a circular ring shape. The phosphor 55 is disposed between the first bank 54 and the second bank 54. The phosphor 55 is disposed so as to cover the LED chips 52.

In the present embodiment, the electrodes 56 are disposed on the rear surface of the substrate 51. In the present embodiment, the electrodes 56 are disposed on the rear surface of the circular ring portion 51A. The electrodes 56 are connected to the controller 17 via a lead wires 58. Each of the lead wires 58 is connected to a corresponding one of the electrodes 56. A pair of the lead wires 58 is supported on a rear surface of the support portion 51B. The electrodes 56 may be disposed on a front surface of the support portion 51B, for example. The lead wires 58 may be supported on the front surface of the support portion 51B.

A current output from the battery pack 25 is supplied to the electrodes 56 via the controller 17 and the lead wires 58. The current supplied to the electrodes 56 is supplied to the LED chips 52 via the substrate 51 and the gold wires 53 (not illustrated in FIGS. 6 to 9). The LED chips 52 emit light based on the current supplied from the battery pack 25.

Figure 10:
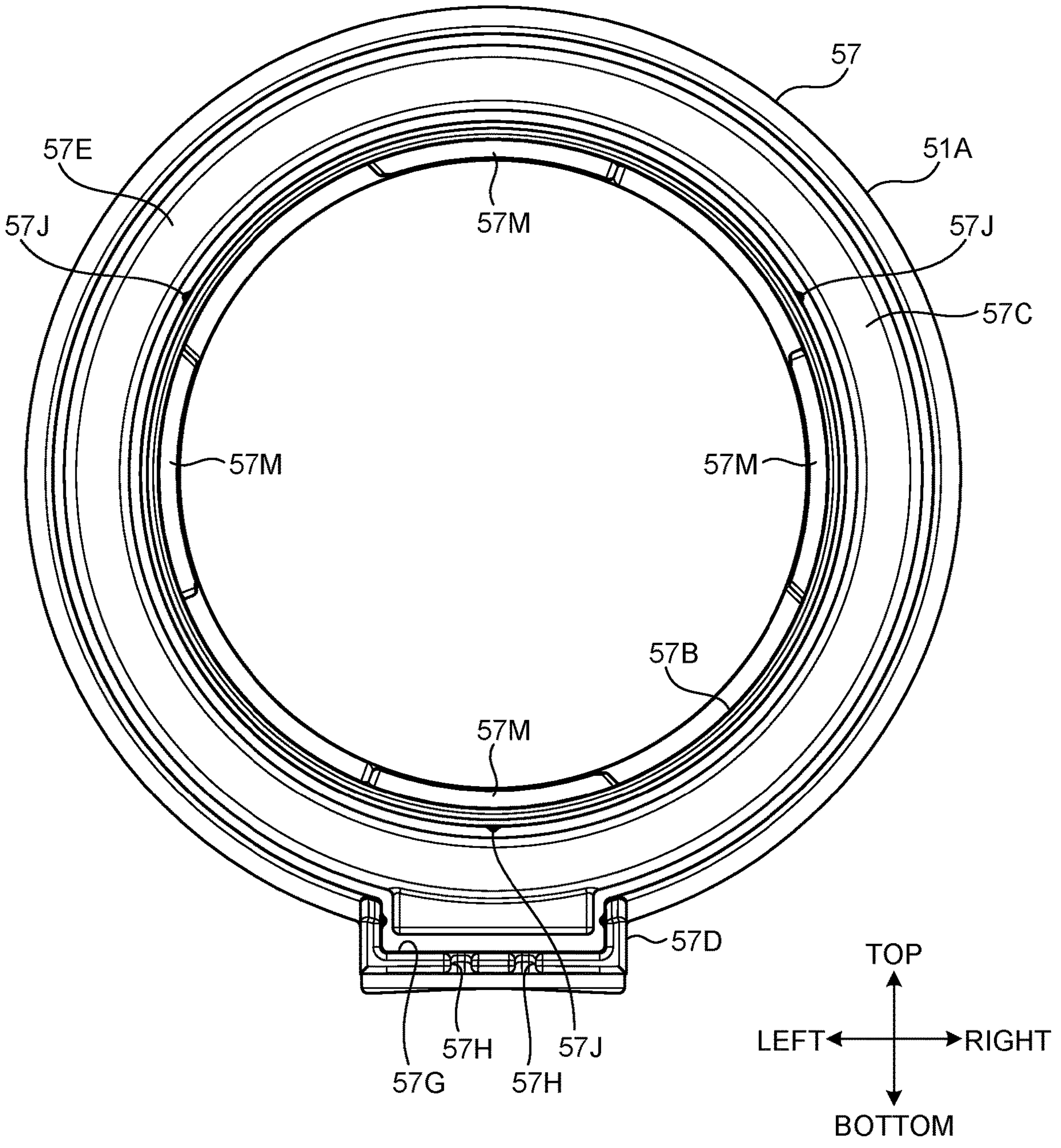
FIG. 10 is a rear view of a light cover according to the first embodiment.

FIG. 10 is a rear view of the light cover 57 according to the present embodiment. The light cover 57 is connected to the chip-on-board light emitting diode 50. The light cover 57 is fixed to the substrate 51. The light cover 57 is made of polycarbonate resin. At least a part of the light cover 57 is disposed in front of the chip-on-board light emitting diode 50. The light cover 57 includes an outer cylindrical portion 57A, an inner cylindrical portion 57B, a light transmission portion 57C, and a support portion 57D.

The outer cylindrical portion 57A is disposed radially outside with respect to the inner cylindrical portion 57B. In the radial direction, at least a part of the chip-on-board light emitting diode 50 is disposed between the outer cylindrical portion 57A and the inner cylindrical portion 57B. The outer cylindrical portion 57A is disposed radially outside with respect to the circular ring portion 51A of the substrate 51. The inner cylindrical portion 57B is disposed radially inside with respect to the circular ring portion 51A of the substrate 51.

The light transmission portion 57C has a circular ring shape. The light transmission portion 57C is disposed so as to connect a front end portion of the outer cylindrical portion 57A and a front end portion of the inner cylindrical portion 57B. The light transmission portion 57C faces the front surface of the circular ring portion 51A. The light transmission portion 57C faces the LED chips 52. The light emitted from the LED chips 52 passes through the light transmission portion 57C and is emitted forward from the light unit 18.

The light transmission portion 57C has an light entrance surface 57E on which the light from the LED chips 52 is incident, and an light exit surface 57F from which the light transmitted through the light transmission portion 57C is output. The light entrance surface 57E faces the LED chips 52. The light emitted from the LED chips 52 and then incident on the light entrance surface 57E is output from the light exit surface 57F. The light entrance surface 57E faces substantially rearward. The light exit surface 57F faces substantially forward.

The support portion 57D is provided so as to protrude downward from a lower portion of the outer cylindrical portion 57A. A recess 57G is formed in the support portion 57D. The support portion 51B of the substrate 51 is disposed in the recess 57G. Two notches 57H are formed in the support portion 57D. The lead wires 58 are respectively disposed in the notches 57H.

Figure 11:
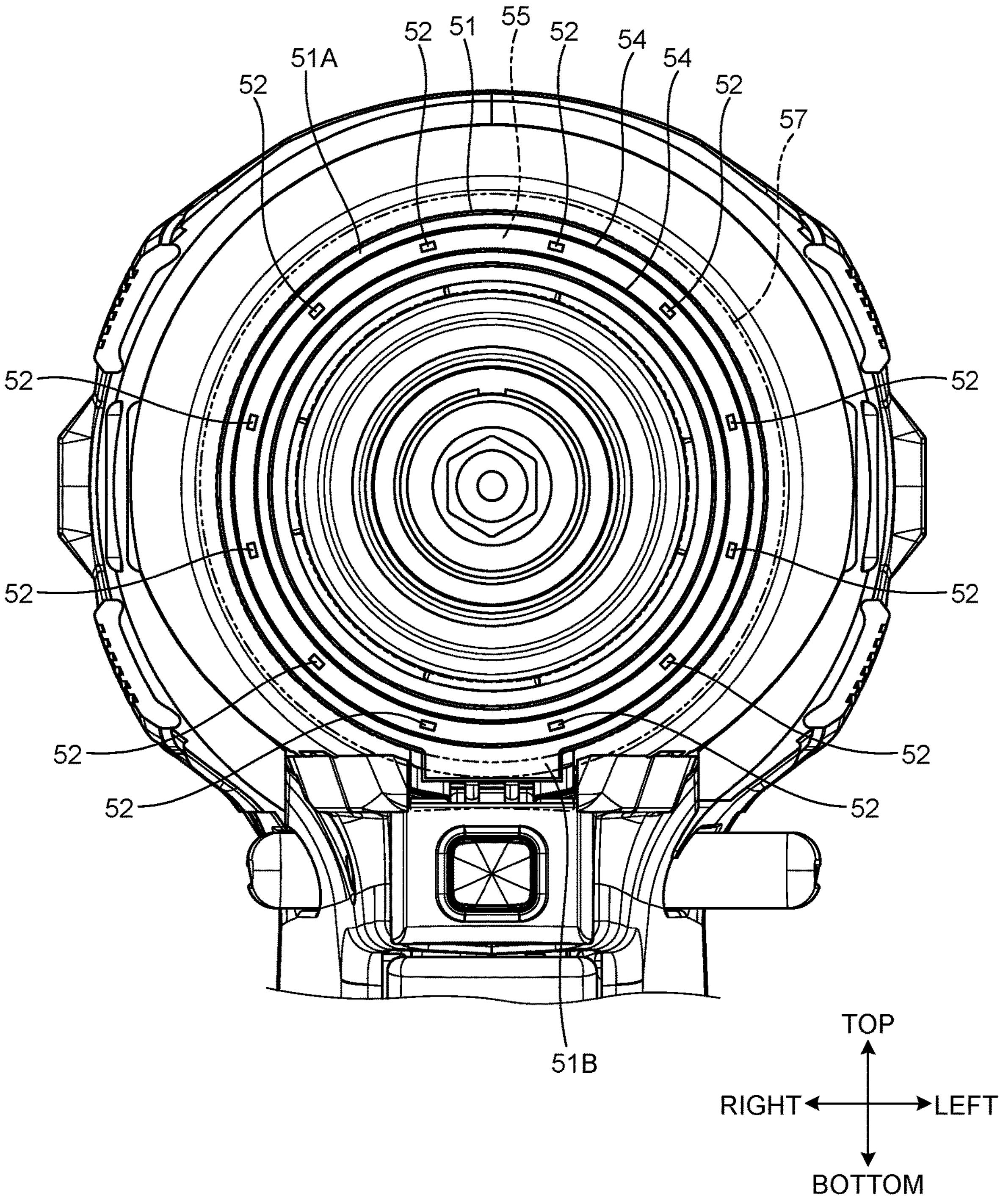
FIG. 11 is a front view of the upper portion of the power tool according to the first embodiment.
Figure 12:
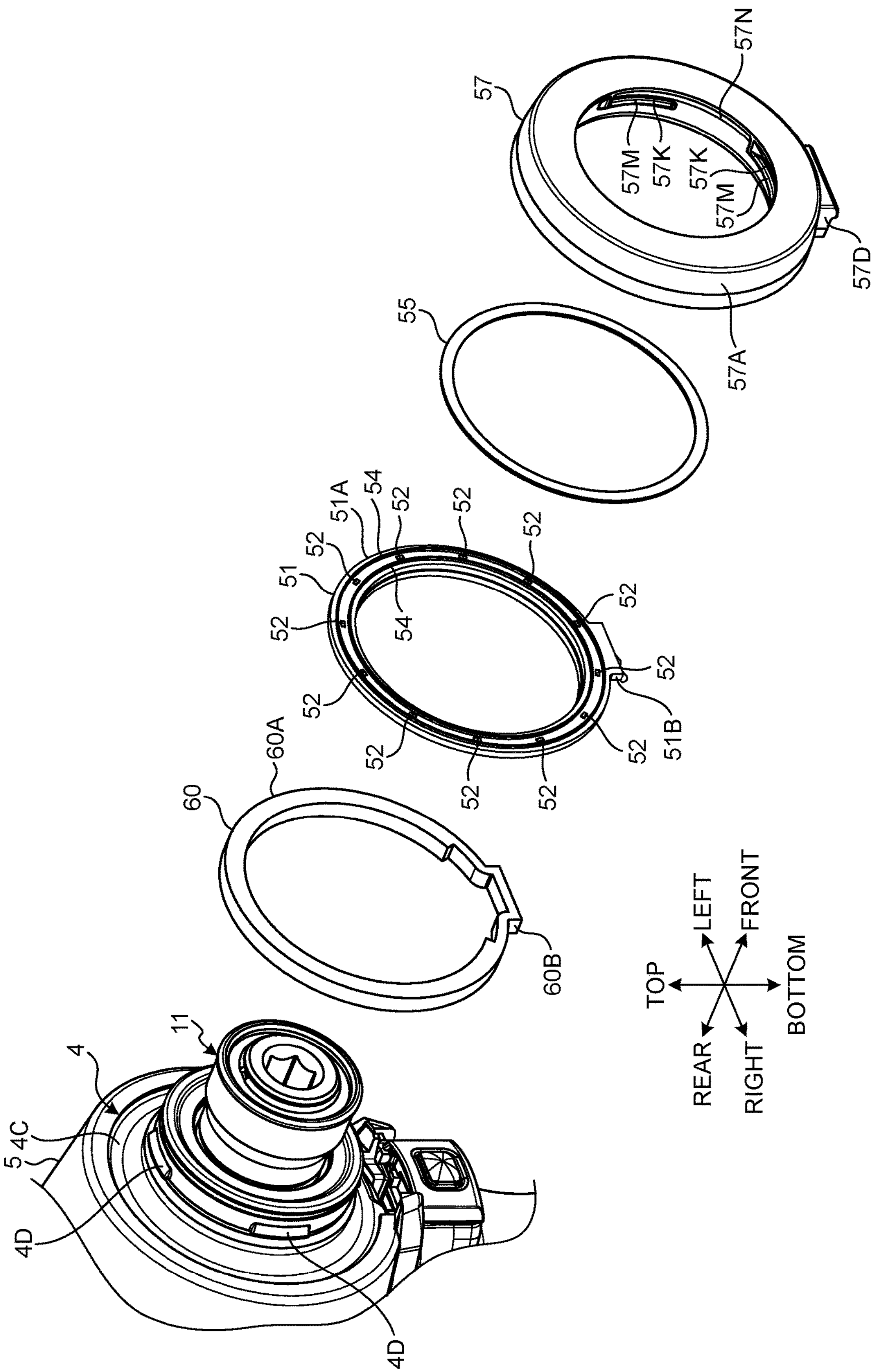
FIG. 12 is an exploded oblique view, viewed from the front, which illustrates the upper portion of the power tool according to the first embodiment.
Figure 13:
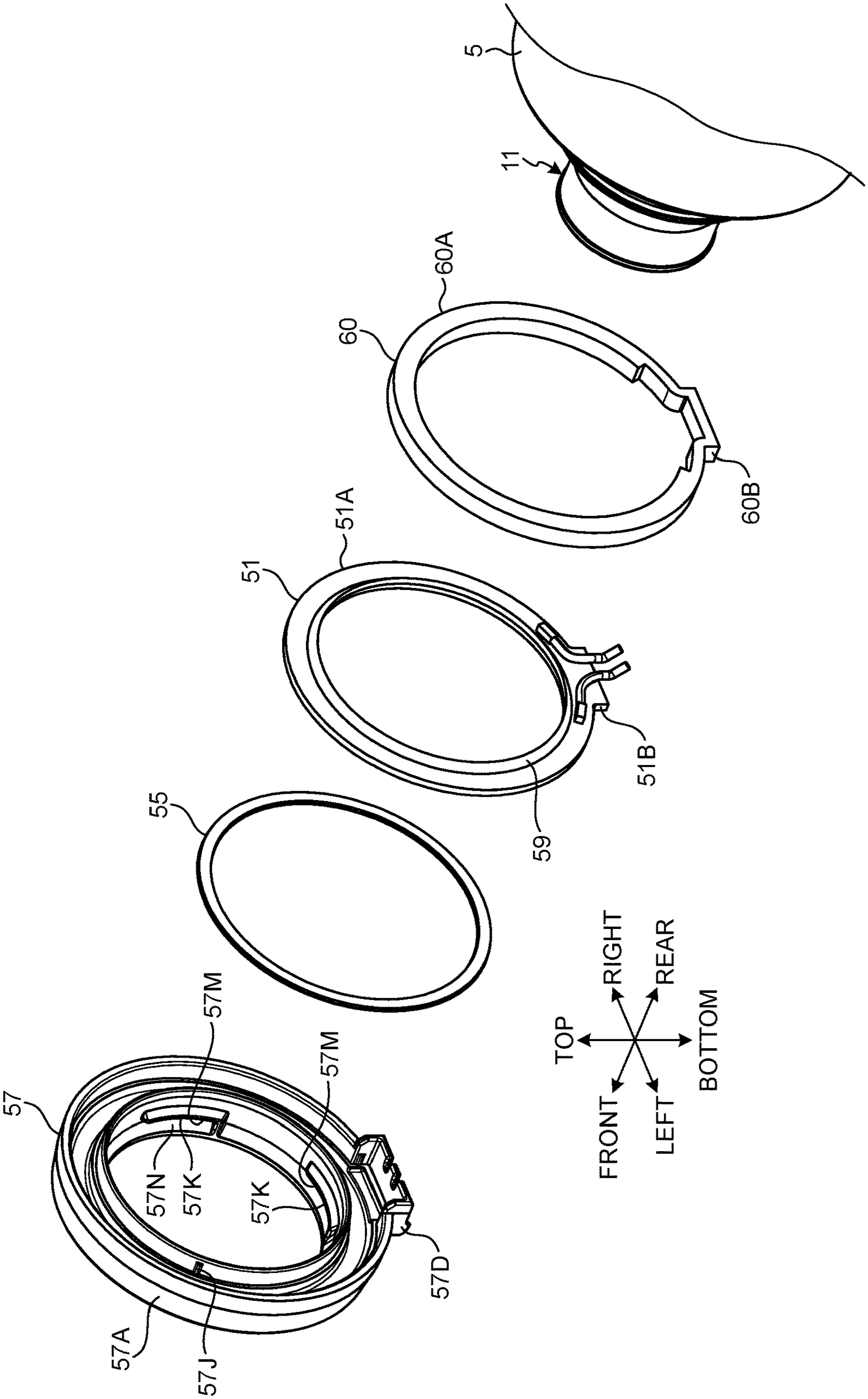
FIG. 13 is an exploded oblique view, viewed from the rear, which illustrates the upper portion of the power tool according to the first embodiment.
Figure 14:
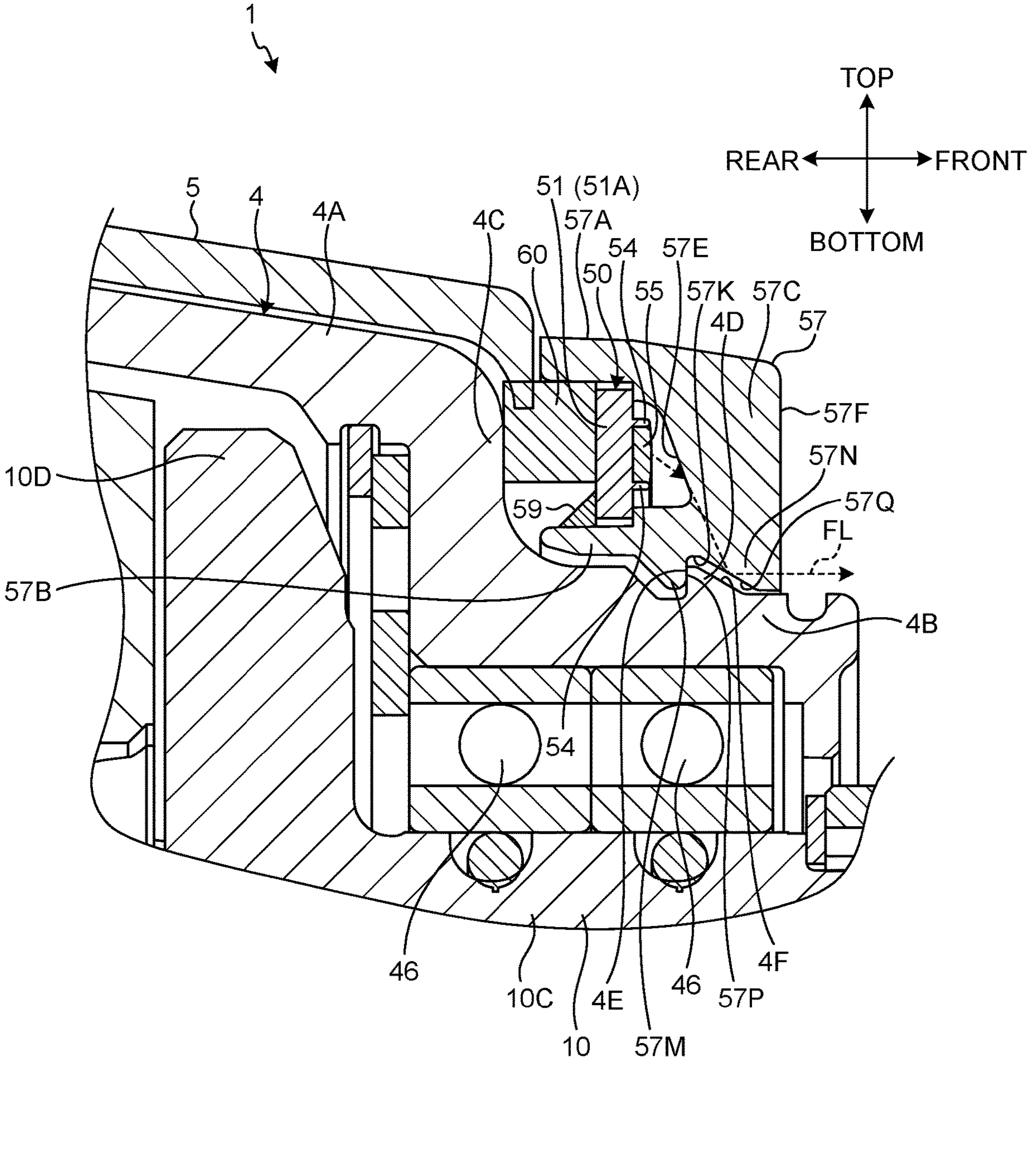
FIG. 14 is a cross-sectional view illustrating a part of the power tool according to the first embodiment.

FIG. 11 is a front view of the upper portion of the power tool 1 according to the present embodiment. FIG. 12 is an exploded oblique view, viewed from the front, which illustrates the upper portion of the power tool 1 according to the present embodiment. FIG. 13 is an exploded oblique view, viewed from the rear, which illustrates the upper portion of the power tool 1 according to the present embodiment. FIG. 14 is a cross-sectional view illustrating a part of the power tool 1 according to the present embodiment.

The light unit 18 including the chip-on-board light emitting diode 50 is disposed around the anvil shaft portion 10C of the anvil 10. The light unit 18 including the chip-on-board light emitting diode 50 is disposed around the front cylindrical portion 4B of the hammer case 4. The inner cylindrical portion 57B of the light cover 57 is disposed around the front cylindrical portion 4B of the hammer case 4. The inner cylindrical portion 57B of the light cover 57 is fixed to the front cylindrical portion 4B of the hammer case 4.

The substrate 51 is fixed to the light cover 57. In the radial direction, the substrate 51 is disposed between the outer cylindrical portion 57A and the inner cylindrical portion 57B. As illustrated in FIGS. 9 and 10, support protrusions 57J are provided on an outer circumferential surface of the inner cylindrical portion 57B. The support protrusions 57J protrude radially outward from the outer circumferential surface of the inner cylindrical portion 57B. The support protrusions 57J are provided at intervals in the circumferential direction. As illustrated in FIG. 10, in the present embodiment, three support protrusions 57J are provided at intervals in the circumferential direction. An inner circumferential surface of the circular ring portion 51A of the substrate 51 is supported by the support protrusions 57J. The substrate 51 is fixed to the inner cylindrical portion 57B via an adhesive 59 (FIG. 7). In the present embodiment, the rear surface of the substrate 51 and the outer circumferential surface of the inner cylindrical portion 57B are fixed by the adhesive 59.

Protrusions 4D are provided on the outer circumferential surface of the front cylindrical portion 4B. The protrusions 4D protrude radially outward from the outer circumferential surface of the front cylindrical portion 4B. The protrusions 4D are provided at intervals in the circumferential direction. In the present embodiment, four protrusions 4D are provided at intervals in the circumferential direction. Each of the protrusions 4D has a rear surface 4E facing rearward and a slope 4F inclined radially inward toward the front.

The light cover 57 is fixed to the front cylindrical portion 4B of the hammer case 4. Qn an inner circumferential surface of the inner cylindrical portion 57B of the light cover 57, rear slide portions 57M and front slide portions 57N are provided. The rear slide portions 57M and the front slide portions 57N each protrude radially inward from the inner circumferential surface of the inner cylindrical portion 57B. The front slide portions 57N are disposed forward of the rear slide portions 57M. The rear slide portions 57M are provided at intervals in the circumferential direction. The front slide portions 57N are respectively disposed forward of the rear slide portions 57M. In the present embodiment, as illustrated in FIG. 10, four rear slide portions 57M are provided at intervals in the circumferential direction. The four front slide portions 57N are respectively disposed forward of the four rear slide portions 57M. Recess 57K are provided between the rear slide portions 57M and the front slide portions 57N. The protrusions 4D are disposed inside the recesses 57K. The rear slide portions 57M each have a front surface 57P, which is in contact with the rear surface 4E of each of the protrusions 4D (FIG. 14). The front slide portions 57N each have a slope 57Q, which faces the slope 4F of each of the protrusions 4D. The front surface 57P defines at least a part of the recess 57K. The slope 57Q defines at least a part of the recess 57K.

An insertion port is provided between one end of each of the rear slide portions 57M in the circumferential direction and the corresponding one of the front slide portions 57N. The protrusions 4D are disposed in the recesses 57K via the insertion ports. After the protrusions 4D are inserted into the insertion ports, the light unit 18 is rotated, whereby the protrusions 4D are inserted into the recesses 57K. As a result of the insertion of the protrusions 4D into the recesses 57K, the light cover 57 and the front cylindrical portion 4B of the hammer case 4 are fixed to one another. The light unit 18 and the hammer case 4 are fixed by fixing the light cover 57 and the front cylindrical portion 4B of the hammer case 4.

The light emitted from the LED chips 52 is incident on the light entrance surface 57E via the phosphor 55. As illustrated in FIG. 14, the light entrance surface 57E is inclined forward toward the radial inside. The light incident on the light entrance surface 57E passes through the light transmission portion 57C and then is output through the light exit surface 57F.

In the present embodiment, the inner cylindrical portion 57B has the slopes 57Q that totally reflect the light emitted from the LED chips 52 forward. An inclination angle of the slope 57Q is set in accordance with a relative position between the LED chips 52 and the slopes 57Q so that the light emitted from the LED chips 52 is totally reflected forward. That is, the inclination angle of the slope 57Q is set such that the incident angle of the light emitted from the LED chips 52 with respect to the slope 57Q satisfies the total reflection condition. As indicated by an arrow FL in FIG. 14, at least a part of the light incident on the light entrance surface 57E passes through the interior of the light cover 57 and reaches the slopes 57Q. Each of the slopes 57Q is inclined forward toward the radial inside. The light that has reached the slopes 57Q is totally reflected by the slopes 57Q and travels forward. The light totally reflected by the slopes 57Q is output through the light exit surface 57F.

In the present embodiment, the impact tool 1 includes a heat dissipation device that dissipates heat of the chip-on-board light emitting diode 50. The heat dissipation device includes a heat dissipation member to which heat of the chip-on-board light emitting diode 50 is transferred. In the present embodiment, the heat dissipation member includes the hammer case 4.

In the present embodiment, the heat of the chip-on-board light emitting diode 50 is transferred to the hammer case 4 via a thermal interface material (TIM) 60. The thermal interface material 60 is disposed between the hammer case 4 and the light unit 18. The thermal interface material 60 is in contact with the substrate 51 of the chip-on-board light emitting diode 50 and the hammer case 4.

In the present embodiment, the thermal interface material 60 is disposed between the rear surface of the substrate 51 and the front surface of the annular portion 4C. The thermal interface material 60 is in contact with the rear surface of the substrate 51 and the front surface of the annular portion 4C. The thermal conductivity of the thermal interface material 60 is higher than the thermal conductivity of air. The thermal conductivity of the thermal interface material 60 is higher than the thermal conductivity of the substrate 51. The thermal conductivity of the thermal interface material 60 is higher than the thermal conductivity of the light cover 57. The thermal interface material 60 is an electrically insulating material.

The thermal interface material 60 may be a coating film applied to one or both of the substrate 51 and the hammer case 4, or may have a solid sheet shape. In the present embodiment, the thermal interface material 60 is a solid sheet-like member. In the following description, the thermal interface material 60 is appropriately referred to as a thermal interface sheet 60.

The thermal interface sheet 60 has an annular shape. The thermal interface sheet 60 includes: a circular ring portion 60A in contact with the rear surface of the circular ring portion 51A of the substrate 51; and a protrusion 60B which is in contact with the rear surface of the support portion 51B of the substrate 51. The protrusion 60B protrudes downward from a lower portion of the circular ring portion 60A.

When the trigger lever 14 is operated, the motor 6 is activated (energized), and light is emitted from the LED chips 52 of the chip-on-board light emitting diode 50. The chip-on-board light emitting diode 5 emits (outputs) a higher amount of light, thereby brightly illuminating the work target or work space.

On the other hand, the chip-on-board light emitting diode 50 generates a higher amount of heat, the temperature of the chip-on-board light emitting diode 50 may rise excessively. When the temperature of the chip-on-board light emitting diode 50 exceeds an allowable value, the LED chips 52 may deteriorate and the life of the chip-on-board light emitting diode 50 may be shortened. The allowable value of the temperature of the chip-on-board light emitting diode 50 is, for example, a heat resistant temperature of the LED chips 52.

A component, which generates the most heat, of the chip-on-board light emitting diode 50 is the LED chips 52. Each of the LED chips 52 is disposed in a space surrounded by the substrate 51 and the light cover 57. Heat of the LED chips 52 hardly escapes from a space surrounded by the substrate 51 and the light cover 57. In the present embodiment, the heat of the LED chips 52 is transferred to the hammer case 4 via the substrate 51 and the thermal interface sheet 60. The heat of the chip-on-board light emitting diode 50 transferred to the hammer case 4 is dissipated to the atmospheric space around the hammer case 4. As a result, an excessive rise in temperature of the chip-on-board light emitting diode 50 is suppressed.

The heat dissipation member may include the case cover 5. The thermal interface sheet 60 is in contact with the annular portion 4C of the hammer case 4 and the front end portion of the case cover 5. The heat of the chip-on-board light emitting diode 50 transferred to the case cover 5 is dissipated to the atmospheric space around the case cover 5.

The thermal interface sheet 60 may be disposed away from the case cover 5. The heat of the chip-on-board light emitting diode 50 transferred to the hammer case 4 via the thermal interface sheet 60 is dissipated to the atmospheric space around the case cover 5 via the case cover 5.

The heat dissipation member may include the light cover 57. The substrate 51 is in contact with at least one of the outer cylindrical portion 57A and the inner cylindrical portion 57B in a state of being spaced apart from the light transmission portion 57C. After the heat of the chip-on-board light emitting diode 50 is transferred to the light cover 57, it may be dissipated from the light cover 57 into the atmospheric space. The heat of the chip-on-board light emitting diode 50 may be transferred to the light cover 57 via the adhesive 59.

In the present embodiment, a drive voltage of the light unit 18 is 5 V. The light flux of the light unit 18 is 80 lumens or more and 200 lumens or less. The light flux of the light unit 18 may be 100 lumens or more and 150 lumens or less, or may be 120 lumens or more and 140 lumens or less.

Effects

As described above, in the present embodiment, the impact tool 1 may include the motor 6, the anvil 10, the chip-on-board light emitting diode 50, and the light cover 57. The anvil 10 may be rotated by the rotational force of the motor 6. The chip-on-board light emitting diode 50 may be disposed around the anvil 10. The chip-on-board light emitting diode 50 may include: the substrate 51 having the circular ring portion 51A; and the LED chip 52 disposed on the front surface of the circular ring portion 51A. The light cover 57 may be fixed to the substrate 51. The light cover 57 may include: the inner cylindrical portion 57B disposed radially inside with respect to the circular ring portion 51A; and the light transmission portion 57C through which the light emitted from the LED chip 52 passes. The inner cylindrical portion 57B may include the slope 57Q, serving as a cover slope that totally reflects the light from the LED chip 52 forward.

According to the above configuration, since the slope 57Q that totally reflects the light from the LED chip 52 forward is provided in the inner cylindrical portion 57B of the light cover 57, the loss of the amount of light output from the chip-on-board light emitting diode 50 is suppressed. Since the loss of the light amount is suppressed, the chip-on-board light emitting diode 50 can illuminate the work target with appropriate illuminance. As a result, the irradiation state of the light emitted from the chip-on-board light emitting diode 50 is improved.

In the present embodiment, the slope 57Q may be inclined forward toward the radial inside.

According to the above configuration, since the LED chip 52 are disposed radially outside and rear side with respect to the slopes 57Q, the slopes 57Q is inclined forward toward the radial inside, whereby the slope 57Q can totally reflect the light from the LED chip 52 forward.

In the present embodiment, the light transmission portion 57C may include the light entrance surface 57E facing the LED chip 52, and the light exit surface 57F from which light emitted from the LED chip 52 and incident on the light entrance surface 57E is output. At least a part of the light incident on the light entrance surface 57E may pass through the interior of the light cover 57 to reach the slope 57Q. The light totally reflected by the slope 57Q may be output from the light exit surface 57F.

According to the above configuration, the light from the LED chip 52 passes through the interior of the light cover 57 and is incident on the slopes 57Q at a predetermined incident angle, whereby the light is totally reflected by the slope 57Q.

In the present embodiment, the light entrance surface 57E may be inclined forward toward the radial inside.

According to the above configuration, at least a part of the light emitted from the LED chip 52 is output from the light exit surface 57F so as to diffuse radially outward.

In the present embodiment, the impact tool 1 may include the speed reduction mechanism 7 configured to transmit the rotational force of the motor 6 to the anvil 10, and the hammer case 4 that accommodates therein the speed reduction mechanism 7. The hammer case 4 may include the rear cylindrical portion 4A that accommodates therein the speed reduction mechanism 7, the front cylindrical portion 4B that holds the anvil bearing 46 that supports the anvil 10, and the annular portion 4C that connects the front end portion of the rear cylindrical portion 4A and the rear end portion of the front cylindrical portion 4B. The chip-on-board light emitting diode 50 may be disposed around the front cylindrical portion 4B. The inner cylindrical portion 57B may be disposed around the front cylindrical portion 4B and fixed to the front cylindrical portion 4B.

According to the above configuration, the chip-on-board light emitting diode 50 is fixed to the front cylindrical portion 4B of the hammer case 4 via the light cover 57.

In the present embodiment, the front cylindrical portion 4B may have the protrusions 4D protruding radially outward from the outer circumferential surface of the front cylindrical portion 4B. The inner cylindrical portion 57B may have the recess 57K in which the protrusion 4D is disposed.

According to the above configuration, the chip-on-board light emitting diode 50 is fixed to the front cylindrical portion 4B of the hammer case 4 via the light cover 57.

In the present embodiment, the slope 57Q may define at least a part of the recess 57K.

According to the above configuration, the slope 57Q is provided in the recess 57K.

In the present embodiment, the protrusion 4D may include the slope 4F which is a case slope facing the slope 57Q.

According to the above configuration, the connection between the front cylindrical portion 4B and the inner cylindrical portion 57B is stabilized.

In the present embodiment, the rear slide portion 57M and the front slide portion 57N disposed forward of the rear slide portion 57M may be provided on the inner circumferential surface of the inner cylindrical portion 57B. The rear slide portion 57M and the slide portion may each protrude radially inward from the inner circumferential surface of the inner cylindrical portion 57B. The recess 57K may be provided between the rear slide portion 57M and the front slide portion 57N. The slope 57Q may be provided on the front slide portion 57N.

According to the above configuration, the recess 57K is defined by the rear slide portion 57M and the front slide portion 57N.

In the present embodiment, a plurality of the rear slide portions 57M may be provided at intervals in the circumferential direction of the inner cylindrical portion 57B. A plurality of the front slide portions 57N may be respectively disposed forward of the plurality of rear slide portions 57M. An insertion port may be provided between one end of the rear slide portion 57M in the circumferential direction and the front slide portion 57N. The protrusion 4D may be disposed in the recess 57K via the insertion port.

According to the above configuration, the protrusion 4D is disposed in the recess 57K via the insertion port.

In the present embodiment, the light cover and the gear case may be fixed to one another by inserting the protrusion 4D into the recess 57K, and the insertion of the protrusion 4D into the recess 57K may be done by rotating the light cover 57 after inserting the protrusion 4D into the insertion port.

According to the above configuration, the light cover 57 and the hammer case 4 are fixed to one another by relatively rotating the light cover 57 and the hammer case 4.

In the present embodiment, the light cover 57 may include the outer cylindrical portion 57A disposed radially outside with respect to the circular ring portion 51A. The light transmission portion 57C may be disposed so as to connect the front end portion of the outer cylindrical portion 57A and the front end portion of the inner cylindrical portion 57B.

According to the above configuration, since the outer cylindrical portion 57A of the light cover 57 is disposed radially outside with respect to the circular ring portion 51A, and the inner cylindrical portion 57B of the light cover 57 is disposed radially inside with respect to the circular ring portion 51A, the connection between the substrate 51 and the light cover 57 is stabilized.

Second Embodiment

A second embodiment will be described. In the following description, the same or equivalent components as those of the above-described embodiment are denoted by the same reference signs, and the description of the components is simplified or omitted.

Power Tool

Figure 15:
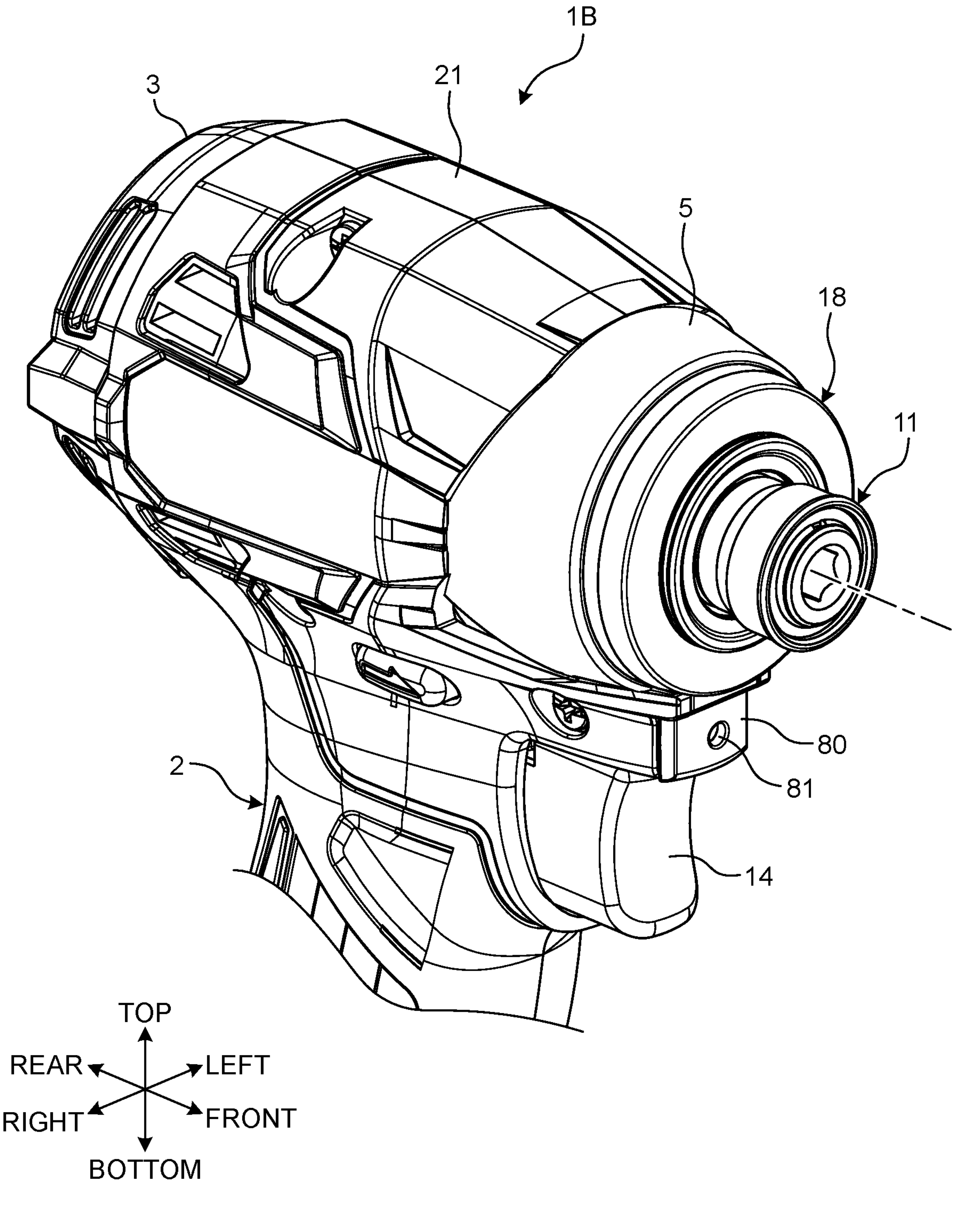
FIG. 15 is an oblique view, viewed from the front, which illustrates a part of a power tool according to a second embodiment.
Figure 16:
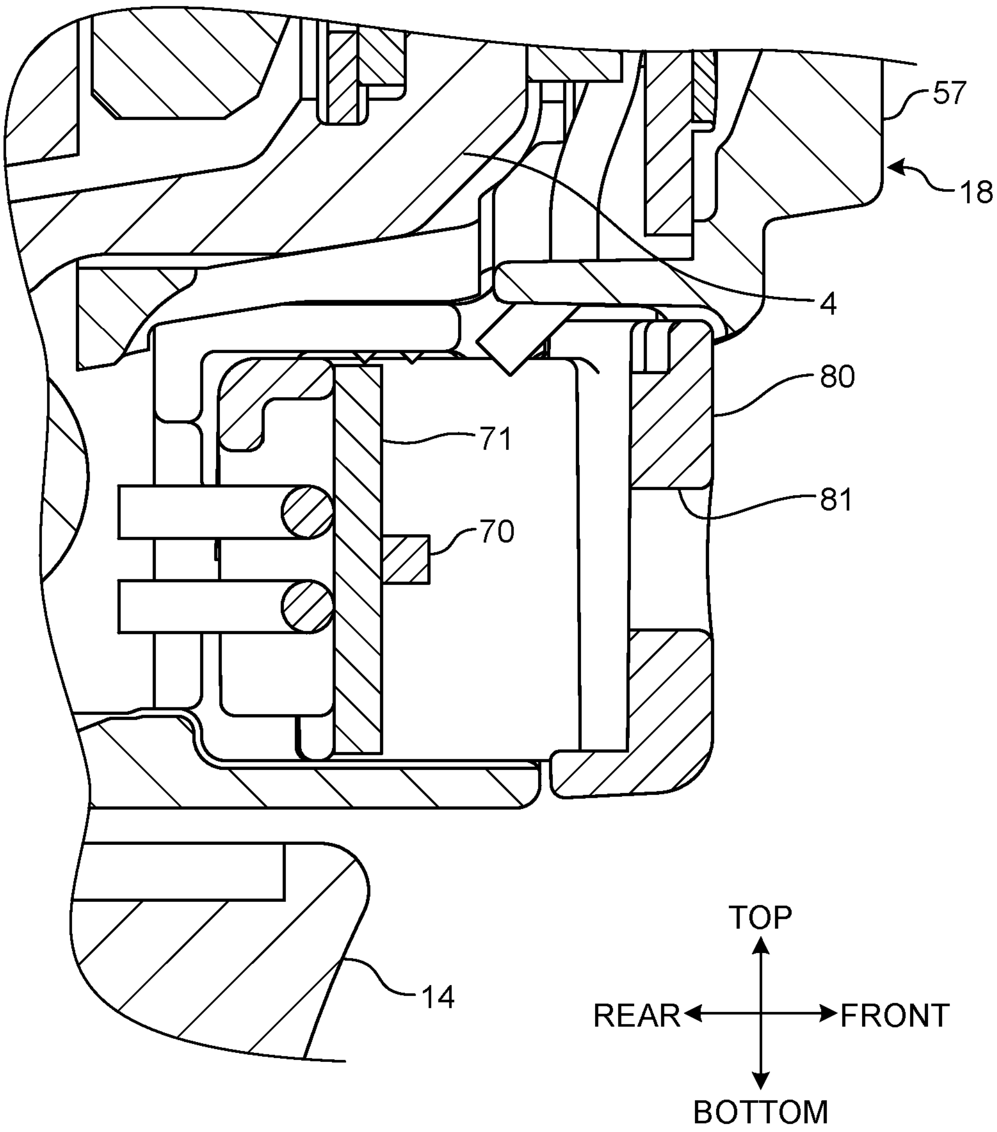
FIG. 16 is a cross-sectional view illustrating a part of the power tool according to the second embodiment.

FIG. 15 is an oblique view, viewed from the front, which illustrates a part of a power tool 1B according to the present embodiment. FIG. 16 is a cross-sectional view illustrating a part of the power tool 1B according to the present embodiment. The power tool 1B is an impact tool 1B.

As in the above-described embodiment, the impact tool 1B includes the hammer case 4 accommodating the speed reduction mechanism 7, the trigger lever 14 that is operated to start the motor 6, and the light unit 18.

In the present embodiment, the impact tool 1B includes an illuminance sensor 70. In the up-down direction, the illuminance sensor 70 is disposed between the hammer case 4 and the trigger lever 14. The illuminance sensor 70 is supported by a circuit board 71.

A sensor cover 80 is disposed forward of the illuminance sensor 70. The illuminance sensor 70 receives light through an opening 81 provided in the sensor cover 80.

Figure 17:
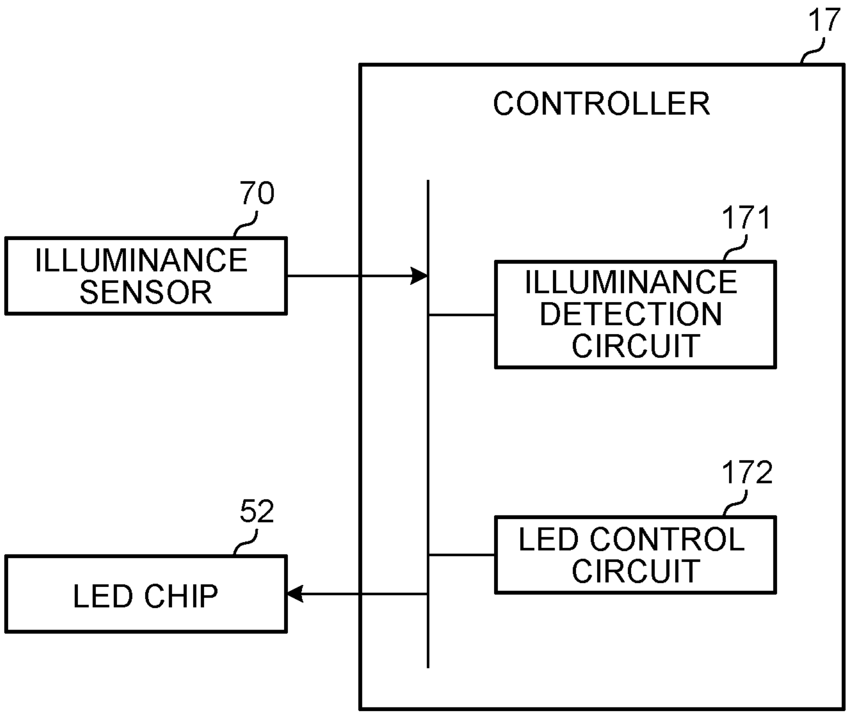
FIG. 17 is a block diagram illustrating the power tool according to the second embodiment.

FIG. 17 is a block diagram illustrating a power tool 1B according to the present embodiment. As illustrated in FIG. 17, the controller 17 includes an illuminance detection circuit 171 and an LED control circuit 172. The illuminance detection circuit 171 acquires detection data of the illuminance sensor 70, and calculates a detection value of the illuminance sensor 70. In the present embodiment, the illuminance sensor 70 receives light that is emitted from the LED chips 52 and then reflected by the work target. The detection value of the illuminance sensor 70 indicates the illuminance of the light reflected by the work target. The LED control circuit 172 controls an irradiation state of the light emitted from the chip-on-board light emitting diode 50 based on the detection value of the illuminance sensor 70 calculated by the illuminance detection circuit 171.

Figure 18:
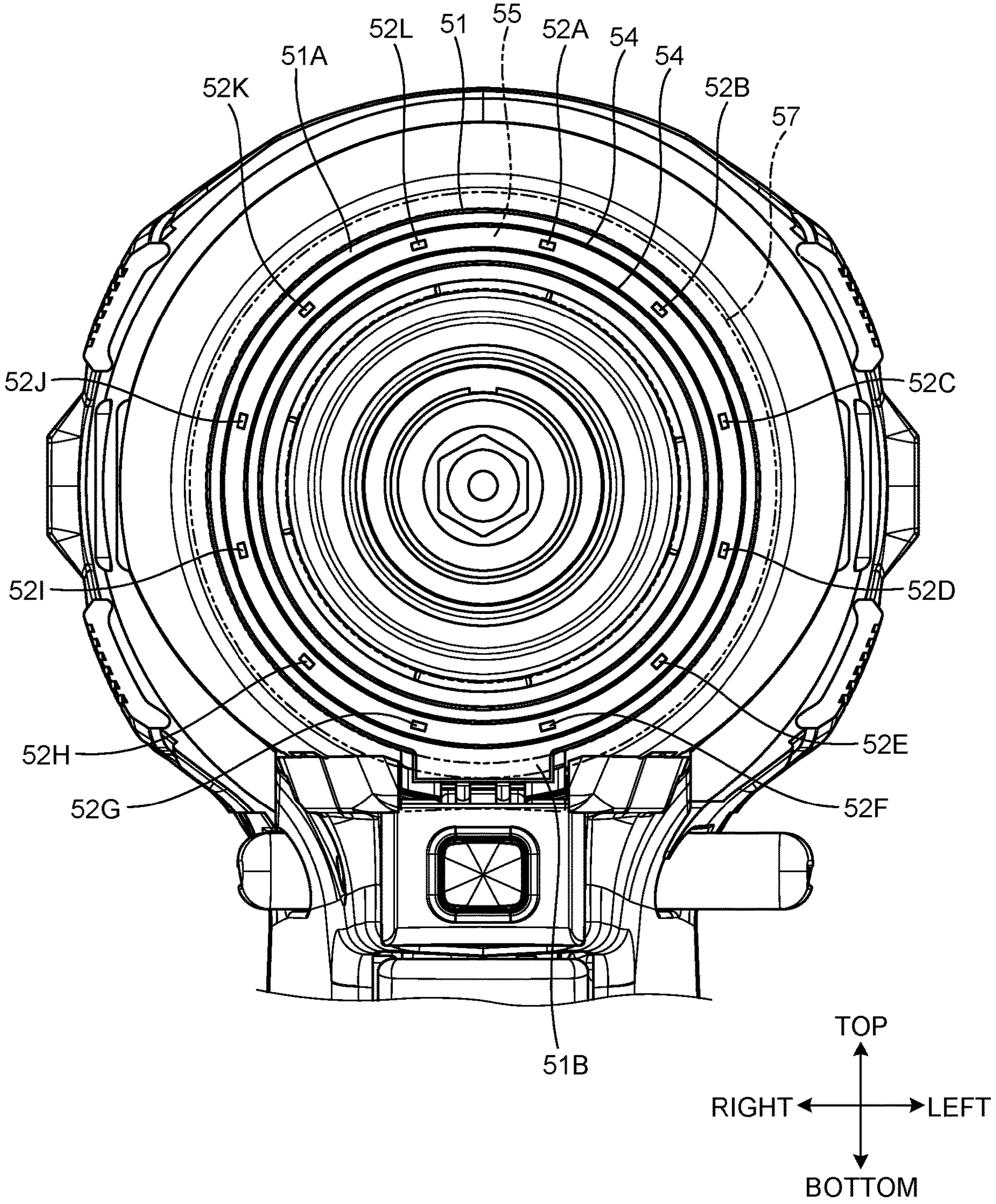
FIG. 18 is a diagram illustrating a plurality of LED chips according to the second embodiment.

FIG. 18 is a diagram illustrating a plurality of the LED chips 52 according to the present embodiment. Similar to the above-described embodiment, the light unit 18 has twelve LED chips 52 arranged in the circumferential direction. In the following description, the twelve LED chips 52 arranged in the circumferential direction are referred to as an LED chip 52A, an LED chip 52B, an LED chip 52C, an LED chip 52D, an LED chip 52E, an LED chip 52F, an LED chip 52G, an LED chip 52H, an LED chip 52I, an LED chip 52J, an LED chip 52K, and an LED chip 52L, respectively.

The LED chip 52B is arranged adjacent to the LED chip 52A on one side in the circumferential direction. The LED chip 52C is arranged adjacent to the LED chip 52B on one side in the circumferential direction. The LED chip 52D is arranged adjacent to the LED chip 52C on one side in the circumferential direction. The LED chip 52E is arranged adjacent to the LED chip 52D on one side in the circumferential direction. The LED chip 52F is arranged adjacent to the LED chip 52E on one side in the circumferential direction. The LED chip 52G is arranged adjacent to the LED chip 52F on one side in the circumferential direction. The LED chip 52H is arranged adjacent to the LED chip 52G on one side in the circumferential direction. The LED chip 52I is arranged adjacent to the LED chip 52H on one side in the circumferential direction. The LED chip 52J is arranged adjacent to the LED chip 52I on one side in the circumferential direction. The LED chip 52K is arranged adjacent to the LED chip 52J on one side in the circumferential direction. The LED chip 52L is arranged adjacent to the LED chip 52K on one side in the circumferential direction. The LED chip 52A is arranged adjacent to the LED chip 52L on one side in the circumferential direction.

Figure 19:
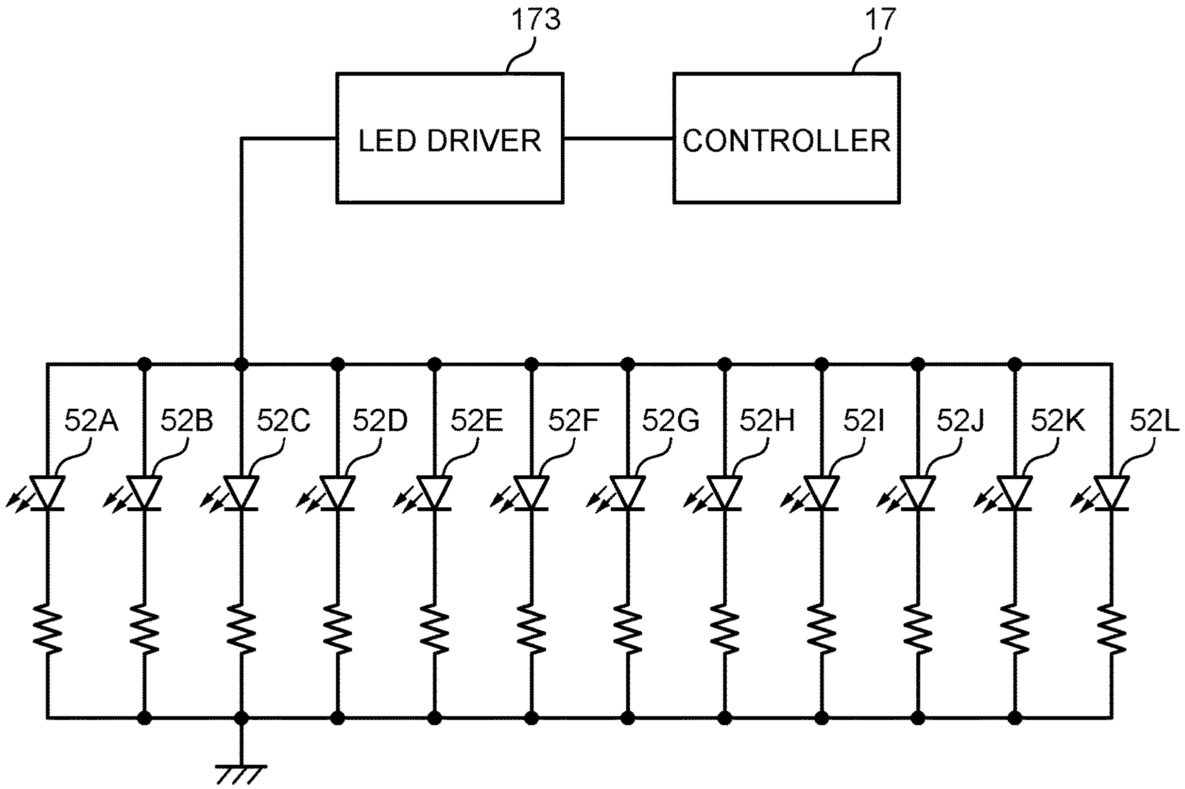
FIG. 19 is a diagram illustrating a first example of a drive circuit of the plurality of LED chips according to the second embodiment.

FIG. 19 is a diagram illustrating a first example of a drive circuit of the LED chips 52 according to the present embodiment. As illustrated in FIG. 19, the twelve LED chips 52 (52A to 52L) are connected in parallel to one another. An LED driver 173 is connected to the twelve LED chips 52. The twelve LED chips 52 are driven by the LED driver 173. The LED driver 173 is controlled by the LED control circuit 172 of the controller 17. Each of the twelve LED chips 52 is grounded via a resistor.

In the example illustrated in FIG. 19, when determining that the detection value of the illuminance sensor 70 exceeds a predetermined allowable value, the LED control circuit 172 of the controller 17 reduces the amount of light emitted from the LED chips 52. That is, when determining that the detection value of the illuminance sensor 70 exceeds the allowable value in a state where all of the twelve LED chips 52 are turned on (emit light) with the first light amount, the LED control circuit 172 of the controller 17 causes all of the twelve LED chips 52 to emit light with the second light amount lower than the first light amount.

Alternatively, when determining that the detection value of the illuminance sensor 70 exceeds a predetermined allowable value, the LED control circuit 172 of the controller 17 may stop light emission of some of the twelve LED chips 52.

Figure 20:
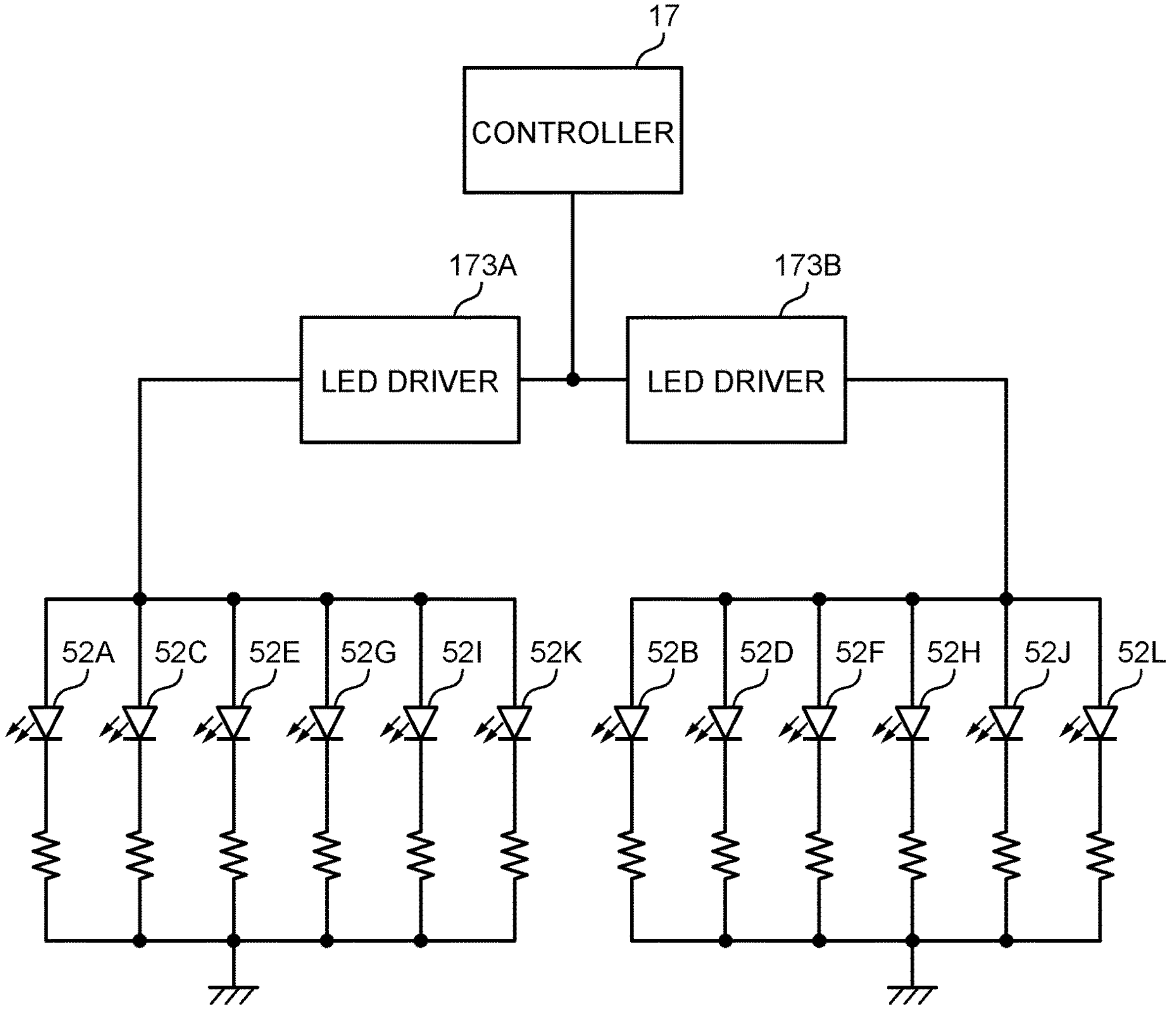
FIG. 20 is a diagram illustrating a second example of the drive circuit of the plurality of LED chips according to the second embodiment.

FIG. 20 is a diagram illustrating a second example of the drive circuit of the plurality of LED chips 52 according to the present embodiment. As illustrated in FIG. 20, six LED chips 52 of a first group including the LED chips 52A, 52C, 52E, 52G, 52I, and 52K are connected in parallel to one another, and six LED chips 52 of a second group including the LED chips 52B, 52D, 52F, 52H, 52J, and 52L are connected in parallel to one another. A first LED driver 173A is connected to the six LED chips 52 of the first group, and a second LED driver 173B is connected to the six LED chips 52 of the second group. The six LED chips 52 of the first group are driven by the first LED driver 173A, and the six LED chips 52 of the second group are driven by the second LED driver 173B. Each of the first LED driver 173A and the second LED driver 173B is controlled by the controller 17. Each of the twelve LED chips 52 is grounded via a resistor.

In the example illustrated in FIG. 20, when determining that the detection value of the illuminance sensor 70 exceeds the allowable value in a state where all of the twelve LED chips 52 are turned on, the LED control circuit 172 of the controller 17 continues turning on the six LED chips 52 of the first group and turns off the six LED chips 52 of the second group. The LED chips 52 to be turned on and the LED chips 52 to be turned off are alternately arranged one by one in the circumferential direction.

In a case where it is determined that the detection value of the illuminance sensor 70 exceeds the allowable value, the number and position of the LED chips 52 to be turned on and the number and position of the LED chips 52 to be turned off can be arbitrarily set. For example, in a case where it is determined that the detection value of the illuminance sensor 70 exceeds the allowable value while the twelve LED chips 52 are turned on, the LED control circuit 172 of the controller 17 may continue turning on the eight LED chips 52 and turn off the remaining four LED chips 52. The LED chip 52 to be turned on and the LED chip 52 to be turned off may be alternately arranged in the circumferential direction.

Effects

As described above, in the present embodiment, the impact tool 1B may include the chip-on-board light emitting diode 50 disposed around the anvil 10, the illuminance sensor 70, and the controller 17 including the LED control circuit 172 configured to control the irradiation state of the light emitted from the chip-on-board light emitting diode 50 based on the detection value of the illuminance sensor 70.

According to the above configuration, since the irradiation state of the light emitted from the chip-on-board light emitting diode 50 is controlled by the LED control circuit 172 of the controller 17 based on the detection value of the illuminance sensor 70, the work target is illuminated with appropriate illuminance. Therefore, the irradiation state of the light emitted from the chip-on-board light emitting diode 50 is improved.

In the present embodiment, the illuminance sensor 70 may receive light, which is emitted from the LED chip 52 and reflected by the work target. When determining that the detection value of the illuminance sensor 70 exceeds a predetermined allowable value, the LED control circuit 172 of the controller 17 may reduce the amount of light emitted from the LED chip 52.

According to the above configuration, the work target is illuminated with appropriate illuminance. When the amount of light output from the chip-on-board light emitting diode 50 is large, the amount of light reflected by the work target also increases. In a case where the amount of light reflected by the work target is large, a worker may feel dazzled, and may feel uncomfortable or the workability may be deteriorated. When the amount of light reflected by the work target is large enough for the worker to feel glare, that is, when the detection value of the illuminance sensor 70 exceeds a predetermined allowable value, the LED control circuit 172 of the controller 17 reduces the amount of light emitted from the LED chip 52. As a result, the work target is illuminated with appropriate illuminance, and the worker is prevented from feeling dazzled by the light reflected by the work target. As a result, the irradiation state of the light emitted from the chip-on-board light emitting diode 50 is improved.

In the present embodiment, the plurality of LED chips 52 may be provided. The illuminance sensor 70 may receive light emitted from each of the plurality of LED chips 52 and reflected by the work target. When determining that the detection value of the illuminance sensor 70 exceeds a predetermined allowable value, the LED control circuit 172 of the controller 17 may stop light emission of some of the plurality of LED chips 52.

According to the above configuration, when the amount of light reflected by the work target is large enough for the worker to feel glare, that is, when the detection value of the illuminance sensor 70 exceeds a predetermined allowable value, the LED control circuit 172 of the controller 17 may stop light emission of some of the plurality of LED chips 52. As a result, the work target is illuminated with appropriate illuminance, and the worker is prevented from feeling dazzled by the light reflected by the work target. As a result, the irradiation state of the light emitted from the chip-on-board light emitting diode 50 is improved.

In the present embodiment, the impact tool 1B may include the speed reduction mechanism 7 configured to transmit the rotational force of the motor 6 to the anvil 10, the hammer case 4 that accommodates therein the speed reduction mechanism 7, and the trigger lever 14 configured to be operated to start the motor 6. The illuminance sensor 70 may be disposed between the hammer case 4 and the trigger lever 14.

According to the above configuration, the illuminance sensor 70 can receive the light emitted from the chip-on-board light emitting diode 50 and reflected by the work target.

In the present embodiment, the impact tool 1B may include the sensor cover 80 disposed forward of the illuminance sensor 70. The illuminance sensor 70 may receive light through the opening 81 provided in the sensor cover 80.

According to the above configuration, the ambient light is prevented from entering the illuminance sensor 70. The illuminance sensor 70 can appropriately receive light reflected by the work target.

Third Embodiment

A third embodiment will be described. In the following description, the same or equivalent components as those of the above-described embodiment are denoted by the same reference signs, and the description of the components is simplified or omitted.

Light Cover

Figure 21:
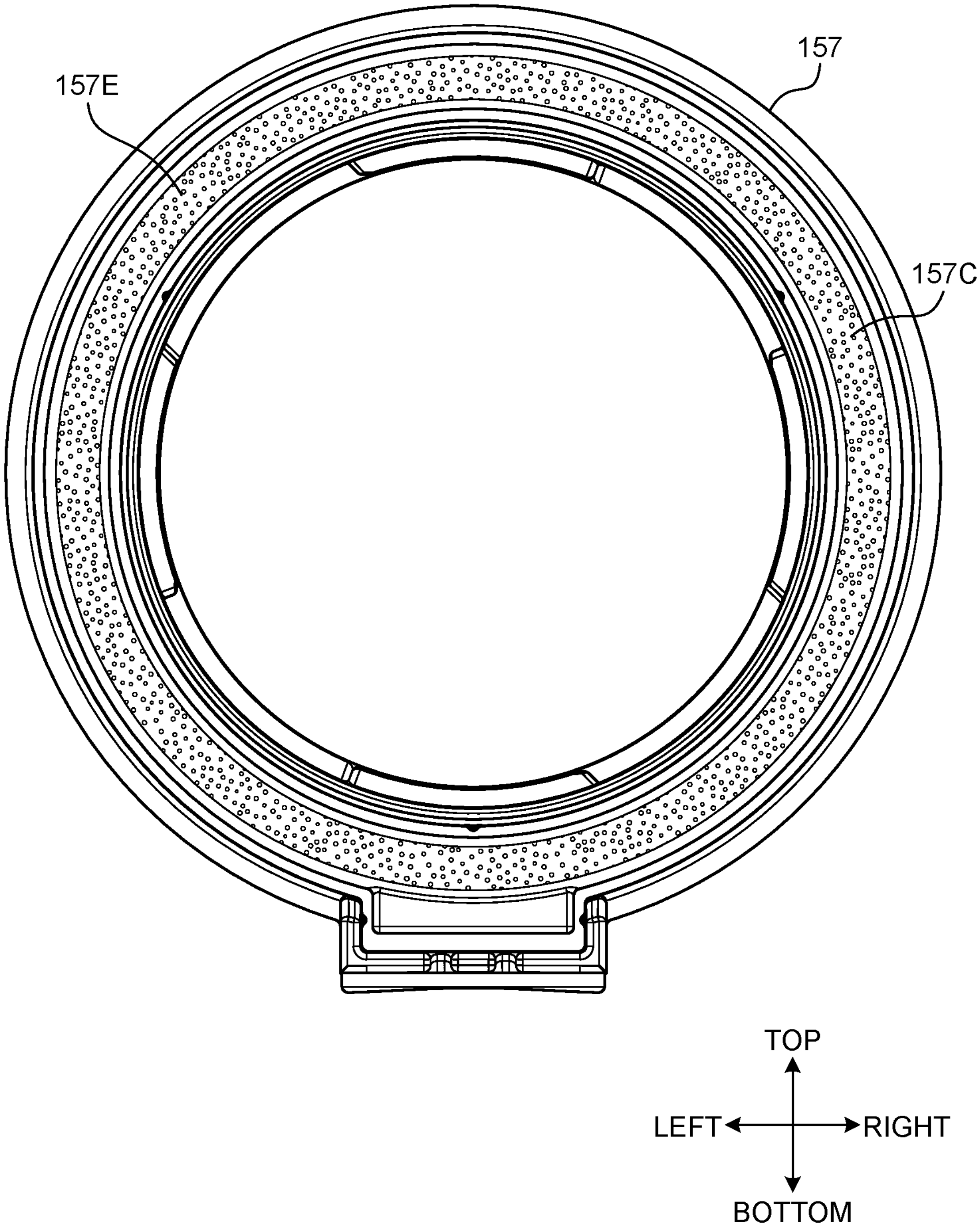
FIG. 21 is a rear view of a light cover according to a third embodiment.

FIG. 21 is a rear view of a light cover 157 according to the present embodiment. As illustrated in FIG. 21, a minute uneven portion may be formed on a light entrance surface 157E of the light cover 157. A plurality of uneven portions are uniformly formed on the light entrance surface 157E. In the present embodiment, fine uneven portions are formed on the light entrance surface 157E by embossing the light entrance surface 157E.

Effects

As described above, in the present embodiment, a light transmission portion 157C may include the light entrance surface 157E facing the LED chip 52. The uneven portion may be formed on the light entrance surface 157E.

In the above configuration, since the uneven portion is formed on the light entrance surface 157E, the light emitted from the LED chip 52 is diffused on the light entrance surface 157E. As a result, the work target is illuminated with a uniform illuminance distribution. Therefore, the irradiation state of the light emitted from the chip-on-board light emitting diode 50 is improved.

Fourth Embodiment

A fourth embodiment will be described. In the following description, the same or equivalent components as those of the above-described embodiment are denoted by the same reference signs, and the description of the components is simplified or omitted.

Light Cover

Figure 22:
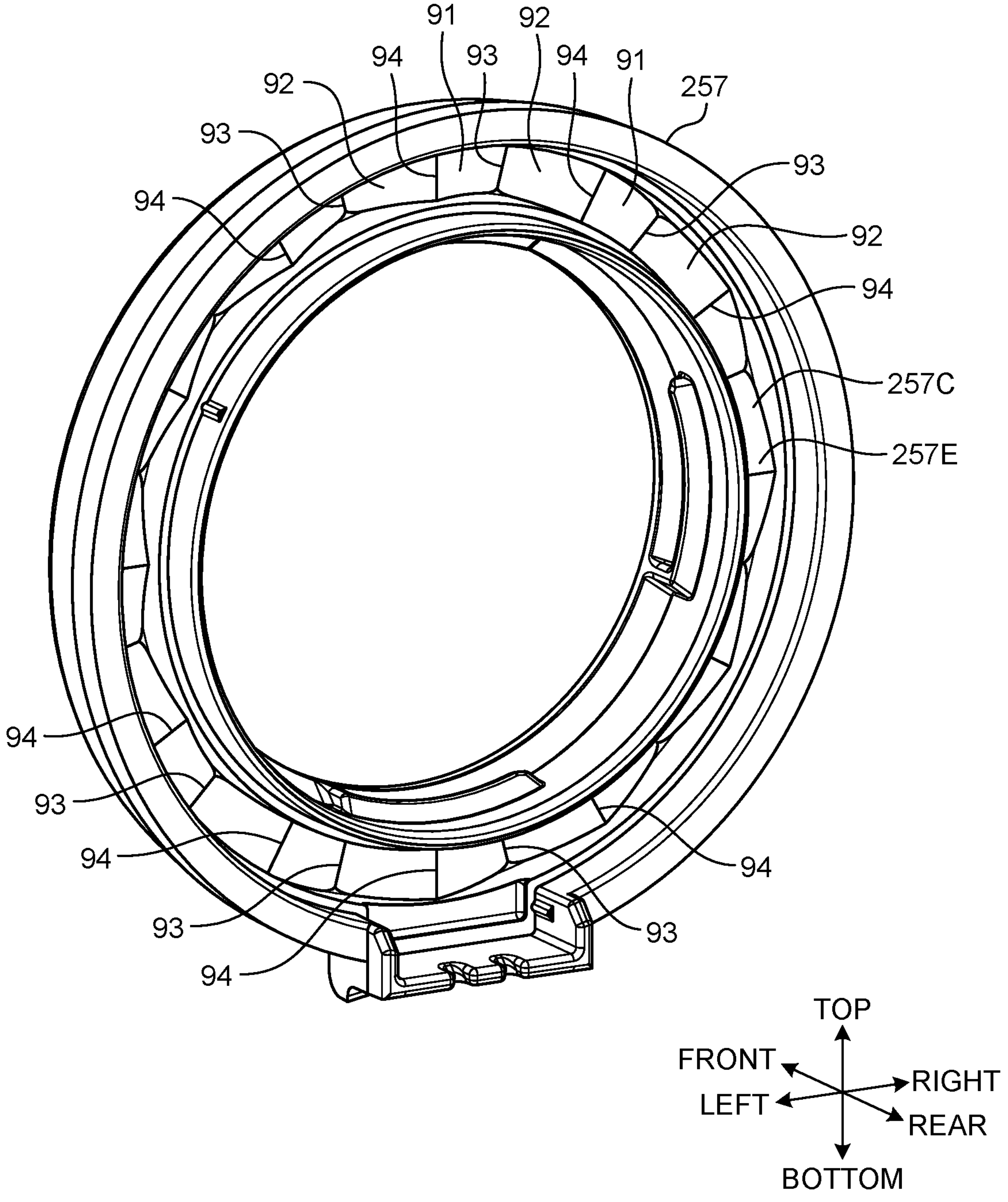
FIG. 22 is an oblique view, viewed from the rear, which illustrates a light cover according to a fourth embodiment.
Figure 23:
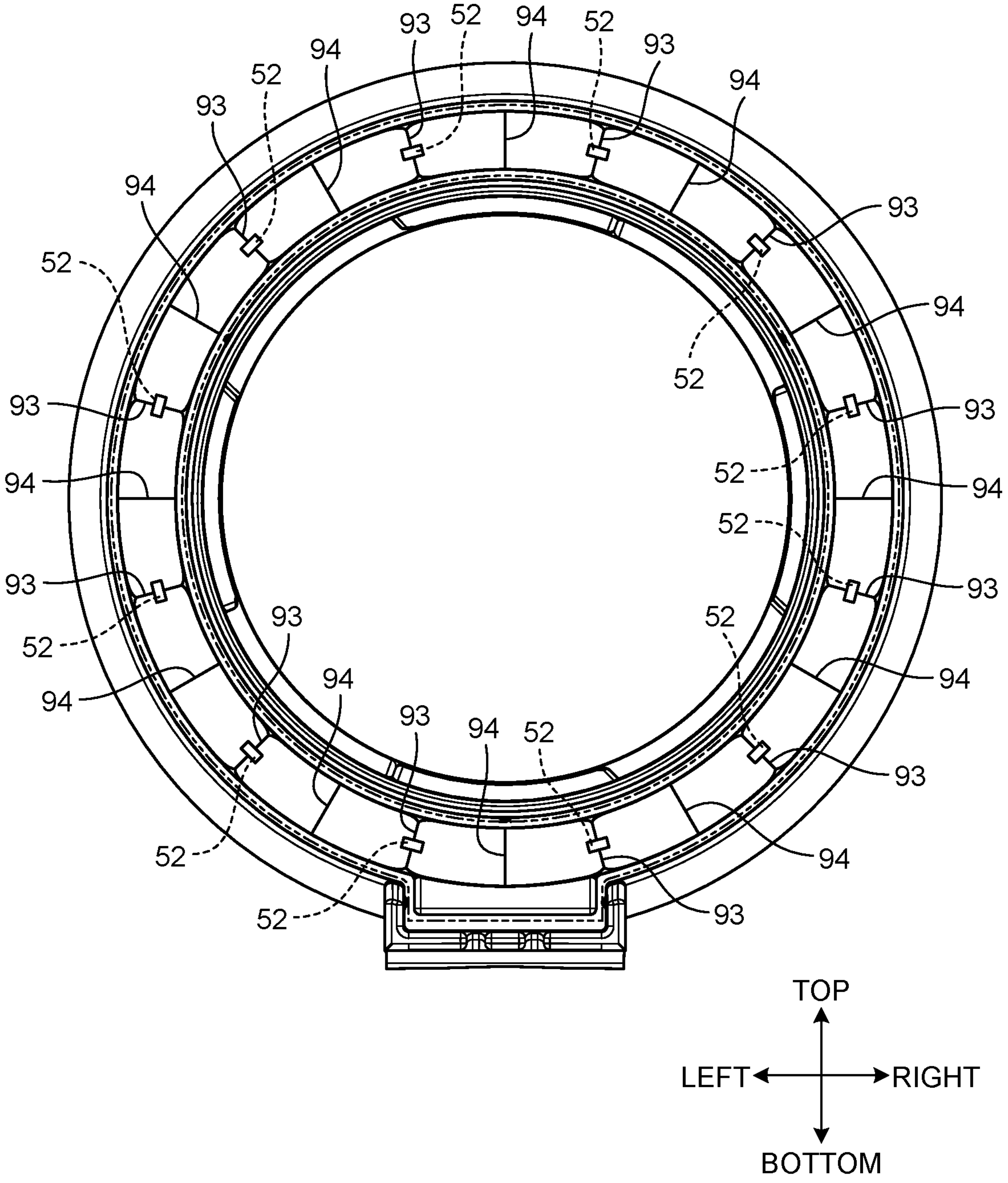
FIG. 23 is a rear view of a light cover according to a fourth embodiment.

FIG. 22 is an oblique view, viewed from the rear, which illustrates a light cover 257 according to the present embodiment. FIG. 23 is a rear view of the light cover 257 according to the present embodiment. As illustrated in FIGS. 22 and 23, the light cover 257 includes a light transmission portion 257C. The light transmission portion 257C has a light entrance surface 257E facing the LED chip 52.

The light entrance surface 257E includes first slopes 91 each inclined forward toward one side in the circumferential direction and second slopes 92 each inclined backward toward one side in the circumferential direction. The first slopes 91 are disposed in the circumferential direction. The second slopes 92 are disposed in the circumferential direction. In the present embodiment, twelve first slopes 91 are disposed in the circumferential direction. Twelve second slopes 92 are disposed in the circumferential direction. The first slopes 91 and the second slopes 92 are alternately arranged one by one in the circumferential direction. An end portion on one side in the circumferential direction of each of the first slopes 91 and an end portion on the other side in the circumferential direction of each of the second slopes 92 are connected. An end portion on one side in the circumferential direction of each of the second slopes 92 and an end portion on the other side in the circumferential direction of each of the first slopes 91 are connected.

A recess 93 is formed by the end portion on one side in the circumferential direction of each of the first slopes 91 and the end portion on the other side in the circumferential direction of each of the second slopes 92. A protrusion 94 is formed by the end portion on one side in the circumferential direction of each of the second slopes 92 and the end portion on the other side in the circumferential direction of each of the first slopes 91. The recesses 93 are formed to extend in the radial direction. The protrusions 94 are formed to extend in the radial direction. The recesses 93 are formed so as to be recessed forward. The protrusions 94 are formed so as to protrude rearward. The recesses 93 are arranged in the circumferential direction. The protrusions 94 are arranged in the circumferential direction. In the present embodiment, twelve recesses 93 are arranged in the circumferential direction. Twelve protrusions 94 are arranged in the circumferential direction. The recesses 93 and the protrusions 94 are alternately arranged one by one in the circumferential direction. The LED chips 52 are disposed so as to face the recesses 93. One LED chip 52 faces one recess 93.

Effects

As described above, in the present embodiment, the light transmission portion 257C may include the light entrance surface 257E facing the LED chip 52. The recess 93 and the protrusion 94 may be formed on the light entrance surface 257E.

According to the above configuration, since the recess 93 and the protrusion 94 are formed on the light entrance surface 257E, the light emitted from the LED chip 52 is diffused on the light entrance surface 257E. In the present embodiment, light emitted from one LED chip 52 is incident on the first slope 91 and the second slope 92 forming the corresponding one of the recesses 93, and then output forward from the light cover 257. As a result, the work target is illuminated with a uniform illuminance distribution. Therefore, the irradiation state of the light emitted from the chip-on-board light emitting diode 50 is improved.

Other Embodiments

In the first, second, and third embodiments described above, the impact tool (e.g., the impact tool 1) is an impact driver. The impact tool (e.g., the impact tool 1) may be an impact wrench.

In the above-described embodiment, the power supply of the power tool (e.g., the impact tool 1) may not be the battery pack (e.g., the battery pack 25), and may be a commercial power supply (AC power supply).

In the above-described embodiments, the power tool (e.g., the impact tool 1) is an electric power tool using an electric motor as a power source. The power tool may be a pneumatic tool using an air motor as a power source. The power source of the power tool is not limited to the electric motor or the air motor, and may be another power source. The power source of the power tool may be, for example, a hydraulic motor or a motor driven by an engine.

According to one non-limiting aspect of the present disclosure, the irradiation state of the light emitted from the chip-on-board light emitting diode is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power tool comprising:
a motor;
an output shaft that is rotated by a rotational force of the motor;
a chip-on-board light emitting diode disposed around the output shaft, the chip-on-board light emitting diode including: a substrate having a circular ring portion; and an LED chip disposed on a front surface of the circular ring portion; and
a light cover fixed to the substrate, the light cover including: an inner cylindrical portion disposed radially inside with respect to the circular ring portion; and a light transmission portion through which light emitted from the LED chip passes, wherein
the inner cylindrical portion includes a cover slope that totally reflects light from the LED chip forward.

2. The power tool according to claim 1, wherein
the cover slope is inclined forward toward a radial inside.

3. The power tool according to claim 1, wherein
the light transmission portion includes a light entrance surface facing the LED chip and a light exit surface from which light emitted from the LED chip and incident on the light entrance surface is output,
at least a part of the light incident on the light entrance surface passes through an interior of the light cover and reaches the cover slope, and
the light totally reflected by the cover slope is output from the light exit surface.

4. The power tool according to claim 3, wherein
the light entrance surface is inclined forward toward a radial inside.

5. The power tool according to claim 1, further comprising:
a speed reduction mechanism configured to transmit a rotational force of the motor to the output shaft; and
a gear case that accommodates therein the speed reduction mechanism, wherein
the gear case includes:
a rear cylindrical portion that accommodates therein the speed reduction mechanism;
a front cylindrical portion that holds a bearing that supports the output shaft; and
an annular portion that connects a front end portion of the rear cylindrical portion and a rear end portion of the front cylindrical portion,
the chip-on-board light emitting diode is disposed around the front cylindrical portion, and
the inner cylindrical portion is disposed around the front cylindrical portion and is fixed to the front cylindrical portion.

6. The power tool according to claim 5, wherein
the front cylindrical portion includes a protrusion protruding radially outward from an outer circumferential surface of the front cylindrical portion, and
the inner cylindrical portion includes a recess in which the protrusion is disposed.

7. The power tool according to claim 6, wherein
the cover slope defines at least a part of the recess.

8. The power tool according to claim 7, wherein
the protrusion includes a case slope facing the cover slope.

9. The power tool according to claim 6, wherein
a rear slide portion and a front slide portion disposed forward of the rear slide portion are provided on an inner circumferential surface of the inner cylindrical portion,
the rear slide portion and the front slide portion each protrude radially inward from the inner circumferential surface of the inner cylindrical portion,
the recess is provided between the rear slide portion and the front slide portion, and
the cover slope is provided on the front slide portion.

10. The power tool according to claim 9, wherein
a plurality of the rear slide portions are provided at intervals in a circumferential direction of the inner cylindrical portion,
a plurality of the front slide portions are respectively disposed forward of the plurality of rear slide portions,
an insertion port is provided between one end of the rear slide portion in a circumferential direction and the front slide portion, and
the protrusion is disposed in the recess via the insertion port.

11. The power tool according to claim 10, wherein
the light cover and the gear case are fixed to one another by inserting the protrusion into the recess, the insertion of the protrusion into the recess being done by rotating the light cover after inserting the protrusion into the insertion port.

12. The power tool according to claim 5,
the light cover includes an outer cylindrical portion disposed radially outside with respect to the circular ring portion, and
the light transmission portion is disposed so as to connect a front end portion of the outer cylindrical portion and a front end portion of the inner cylindrical portion.

13. The power tool according to claim 5, wherein
the output shaft includes an anvil, the power tool further comprises an impact mechanism to which a rotational force of the motor is transmitted via the speed reduction mechanism and that impacts the anvil in a rotation direction, the gear case is a hammer case that accommodates therein the speed reduction mechanism and the impact mechanism.

14. The power tool according to claim 1, wherein the light transmission portion includes a light entrance surface facing the LED chip and a light exit surface from which light emitted from the LED chip and incident on the light entrance surface is output, at least a part of the light incident on the light entrance surface passes through an interior of the light cover and reaches the cover slope, the light totally reflected by the cover slope is output through the light exit surface, and an uneven portion is formed on the light entrance surface.

15. A power tool comprising:

a motor;

an output shaft that is rotated by a rotational force of the motor;

a chip-on-board light emitting diode disposed around the output shaft, the chip-on-board light emitting diode including: a substrate having a circular ring portion; and an LED chip disposed on a front surface of the circular ring portion;

a light cover fixed to the substrate, the light cover including: a light transmission portion through which light emitted from the LED chip passes, and an inner cylindrical portion disposed radially inside with respect to the circular ring portion, wherein the light transmission portion includes a light entrance surface facing the LED chip and a light exit surface from which light emitted from the LED chip and incident on the light entrance surface is output, and an uneven portion is formed on the light entrance surface; wherein the inner cylindrical portion includes a cover slope that totally reflects light from the LED chip forward.

16. A power tool comprising:

a motor;

an output shaft that is rotated by a rotational force of the motor;

a chip-on-board light emitting diode disposed around the output shaft, the chip-on-board light emitting diode including: a substrate having a circular ring portion; and an LED chip disposed on a front surface of the circular ring portion;

a light cover fixed to the substrate, the light cover including: an inner cylindrical portion disposed radially inside with respect to the circular ring portion; and a light transmission portion through which light emitted from the LED chip passes, wherein the inner cylindrical portion includes a cover slope that totally reflects light from the LED chip forward;

an illuminance sensor; and an LED control circuit configured to control an irradiation state of light emitted from the chip-on-board light emitting diode based on a detection value of the illuminance sensor.

17. The power tool according to claim 16, wherein the illuminance sensor receives light, which is emitted from the LED chip of the chip-on-board light emitting diode and reflected by a work target, and the LED control circuit reduces an amount of light emitted from the LED chip when determining that the detection value of the illuminance sensor exceeds a predetermined allowable value.

18. The power tool according to claim 16, wherein a plurality of the LED chips of the chip-on-board light emitting diode are provided, the illuminance sensor receives light emitted from each of the plurality of LED chips and reflected by a work target, and the LED control circuit stops light emission of some of the LED chips when determining that the detection value of the illuminance sensor exceeds a predetermined allowable value.

19. The power tool according to claim 16, further comprising:

a speed reduction mechanism configured to transmit a rotational force of the motor to the output shaft;

a gear case that accommodates therein the speed reduction mechanism; and a trigger lever configured to be operated to start the motor, wherein the illuminance sensor is disposed between the gear case and the trigger lever.

20. The power tool according to claim 19, further comprising a sensor cover disposed forward of the illuminance sensor, wherein the illuminance sensor receives light through an opening provided in the sensor cover.

* * * * *